United States Patent [19]
Maeda

[11] Patent Number: 6,028,828
[45] Date of Patent: Feb. 22, 2000

[54] DISK TYPE RECORDING MEDIUM AND DISK RECORDING AND REPRODUCING DEVICE

[75] Inventor: Shigemi Maeda, Yamatokooriyama, Japan

[73] Assignee: Sharp Kabushiki Kaisha, Osaka, Japan

[21] Appl. No.: 08/917,904

[22] Filed: Aug. 27, 1997

[30] Foreign Application Priority Data

Aug. 30, 1996 [JP] Japan .................................. 8-229586

[51] Int. Cl.⁷ ...................................................... G11B 7/00
[52] U.S. Cl. .......................... 369/50; 369/58; 369/44.13
[58] Field of Search ............................. 369/44.13, 275.3, 369/275.4, 275.2, 58, 48, 50, 59, 44.26

[56] References Cited

U.S. PATENT DOCUMENTS

| | | | |
|---|---|---|---|
| 5,023,856 | 6/1991 | Raaymakers et al. ..................... | 369/32 |
| 5,377,178 | 12/1994 | Saito et al. ............................ | 369/275.3 |
| 5,444,687 | 8/1995 | Okumura . | |
| 5,463,604 | 10/1995 | Naito . | |
| 5,521,895 | 5/1996 | Miura et al. . | |
| 5,537,373 | 7/1996 | Horikiri . | |
| 5,684,774 | 11/1997 | Yamamuro ............................. | 369/275.3 |
| 5,696,758 | 12/1997 | Yanagimachi et al. ............... | 369/275.4 |
| 5,742,582 | 4/1998 | Suzuki .................................. | 369/275.1 |
| 5,757,756 | 5/1998 | Hajjar .................................... | 369/275.1 |
| 5,796,711 | 8/1994 | Tomita et al. ......................... | 369/275.4 |
| 5,809,006 | 5/1996 | Davis et al. .......................... | 369/275.4 |
| 5,835,461 | 6/1996 | Kobayashi et al. .................. | 369/275.3 |
| 5,835,478 | 6/1996 | Kobayashi et al. .................. | 369/275.3 |
| 5,844,883 | 3/1997 | Kanno et al. ......................... | 369/275.4 |
| 5,848,050 | 2/1997 | Nagasawa et al. .................. | 369/275.4 |

FOREIGN PATENT DOCUMENTS

| | | |
|---|---|---|
| 0 399852A2 | 11/1990 | European Pat. Off. . |
| 0813198A2 | 12/1997 | European Pat. Off. . |
| 2-152031 | 6/1990 | Japan . |
| 7-161132A | 6/1995 | Japan . |
| 8-87749 | 4/1996 | Japan . |

*Primary Examiner*—Muhammad Edun

[57] ABSTRACT

A disk type recording medium and a disk recording and reproducing device for use in constant linear velocity and zone constant angular velocity systems wherein the disk type recording medium has spiral or concentric grooves that are divided into a plurality of zones in the radial direction of the disk. Physical address information and sector boundary information are recorded by groove wobbling. Records of data are arranged on grooves with reference to sector boundary information on the condition that a wobble frequency of physical address information obtainable when rotating the disk at a constant angular velocity is constant within a unit zone and increases with each change of zones from inner to outer peripheral zones on the disk.

7 Claims, 19 Drawing Sheets

DISK TYPE RECORDING MEDIUM AND DISK RECORDING AND REPRODUCING DEVICE

BACKGROUND OF THE INVENTION

Recently, optical disk devices are used as devices for realizing random recording and reproducing a large amount of data. The storage capacity of such optical disk devices can be increased by obtaining a constant linear recording density at any place on a disk by employing a constant linear velocity (CLV) method for accessing information on a disk at a constant relative velocity between a light pickup and an optical disk and at a constant recording data frequency. The CLV method makes the disk have a large capacity but a slow access time because circular tracks on the disk have different numbers of sectors per rotation in proportion to radial position and require correspondingly changing the rotation frequency.

On the other hand, the access time can be shortened by employing a constant angular velocity (CAV) method for accessing information on a disk at a constant recording frequency and a constant disk-rotation frequency. The CAV method can shorten the access time to information on the disk with no need for changing the rotation frequency of the disk. However, the disk has a constant number of sectors per rotation independent of radial positions on the disk and, therefore, the outer circular tracks have smaller linear recording density. The memory capacity of the disk can not be improved by the CAV method.

There has been applied a zone constant angular velocity (ZCAV) method for recording and reproducing data on a disk by rotating the disk at a constant rotation frequency, changing the recording data frequency step by step for respective radial zones. This method divides a surface of the disk into a plurality of radial zones in the radial direction from the outer circular tracks to the inner circular tracks. Respective radial zones have respective quantities of sectors. Each zone has a constant number of sectors per rotation in grooves formed therein. The outer radial zone has a larger quantity of sectors per rotation. Thus, the ZCAV method conducts zoning of the disk surface so as to obtain a substantially constant linear recording density on the disk independent of radial positions thereon. The capacity of the disk and the access time thereon can be thus improved.

In a typical disk type recording medium according to the above-mentioned ZCAV system, a surface of a disk is divided into three radial areas (zone 1, 2 arid 3) numbered from the outer periphery of the disk. Each zone includes a plurality of sectors per rotation of the disk. The number of sectors per groove per rotation of the disk is the same for grooves of the same zone.

Each of areas (zone 1 and zone 2) consists of a plurality of grooves. Each groove is divided into a plurality of sectors (per rotation of the disk). Each sector consists of a header indicating a physical sector address on the disk and a data field wherein recording data will be arranged. In each zone, sectors in respective grooves are radially aligned along boundaries on the disk.

The header is of so-called pit-type that is embossed to shut off the groove by a physical sector address information and has been formed together with the groove in advance.

The header consists of a sector mark indicating the beginning of the sector, a VFO field for pulling a phase by a phase locked loop (PLL) for generating a clock necessary for reproducing the physical sector address, an address mark indicating the beginning of the physical sector address, an address field being a physical sector address, an error detection field for detecting an error.

Describing how the above-mentioned disk of the ZCAV system is treated in a disk recording and reproducing device, first the disk is rotated at a constant rotation frequency independent of its radial position (in other words, the outer zone has a higher linear velocity). Furthermore, a recording or reproducing data frequency relating to a data transfer rate changes zone and recording and producing clock signals are generated and applied for changing a data frequency higher at the outer peripheral side of the disk. Accordingly, the access time for the disk may be shortened since there is no need of changing the disk rotation frequency. In addition, the linear recording density can be kept at a substantially constant on any radial position on the disk by increasing the data frequency with an increase of the linear velocity at the outer zones on the disk.

Various kinds of disk devices have been selectably used for applications. For example, the disk devices of the CLV system are applied for recording successive data (e.g., image data) that requires a large storage capacity rather than accessing speed. On the contrary, the disk devices of ZCAV system are applied for recording and reproducing discrete data randomly on the disk in a computer wherein high-speed random access to the disk is necessarily required. However, these types of available disks are quite different from each other in their formats. Manufacturers must produce various types of differently formatted disks that may confuse users.

A conventional disk recording and reproducing device for use with a conventional disk of the ZCAV method can realize high-speed access to information on the disk but has a decreased data frequency, e.g., a reduced transfer rate at the inner radial side of the disk. The ZCAV system disk is inferior to the CLV system disk in data transfer speed when the disk is used for transferring successive data (e.g., image data) or for backing-up the data.

Furthermore, the disk rotation at its inner side in the ZCAV system is lower than that in the ZCLV system since the former system rotates the disk at a constant rotation frequency and the latter system increases the disk rotation at the inner side than at the outer side. This means that the ZCAV system has a longer time to access a desired sector in a rotation of the disk in comparison with the ZCLV system.

A disk recording and reproducing device which is capable of working with differently formatted disks may be manufactured but is very expensive.

In the disk of the ZCAV system, both side boundaries of sectors (minimal unit to be recorded and reproduced) are aligned into radially extending lines. The number of sectors per rotation (per groove) is the same for every groove in the same zone on the disk. This arrangement is needed because the pre-recorded pit-type header may affect data field with a cross-talk if it neighbors with the data field. Namely, the headers shall neighbor with each other and the data fields shall always neighbor with each other to assure reliable data recording therein.

The radial alignment of sectors may, however, cause limiting the linear recording density lower than the ability of the disk or the disk recording and reproducing device since the number of sectors having a specified physical length (for a specified capacity) per rotation of the disk must be a positive integer.

For example, it is assumed that a disk or a device has the recording density of 0.5 $\mu$m per bit, 1 sector is composed of 20000 bits and has a physical length 10 mm. When the sectors of 10 mm in length are allocated to a radial zone at radial position of 30 mm, the circumference is 188.5 mm and the number of allocatable sectors of 10 mm in physical length is about 18.85 (188.5 mm÷10 mm). A positive integer is 18. Accordingly, 18 sectors shall be practically allocated. With 18 sectors per rotation, the bit size at a radius of 30 mm is determined to be 0.523 μm/1 bit. This figure is lower than by about 5% the maximal recording density (0.5 μm/1 bit) of the disk or the device. This means the reduction of memory capacity of the disk.

It is possible to avoid occurrence of cross-talk from a header to data field by radially aligning sector boundaries in each zone. However, neighboring zones are not aligned at their radial sector boundaries in radial direction on the disk. Namely, two zones are arranged in such a way that a header of one zone is faced to a data field of the other zone. Consequently, cross-talk may occur between the header of one zone and a data field of the other zone. Thus, boundary grooves of neighboring zones cannot be used on the disk, resulting in reduction of the disk memory capacity.

A disk is used for recording data on its grooves. The capacity of this disk can be increased if a pitch between grooves is reduced. However, it is impossible to reduce a distance between grooves since the neighboring headers may interfere with each other.

SUMMARY OF THE INVENTION

The present invention relates to a disk type recording medium of a large storage capacity, which allows writing data thereon and is capable of improving data transfer speed and accessing speed, and a disk recording and reproducing device for recording and reproducing various kinds of data on the disk type recording medium.

The present invention was made to provide a disk-type recording medium and a disk recording and reproducing device, both of which are of a large capacity and have an increased data-transfer rate and an improved accessing speed.

A disk-type recording medium and a disk recording and reproducing device according to the present invention comprises particularly as follows:

(1) A disk type recording medium has spiral or concentric grooves, said grooves being divided radially into a plurality of zones to be traced by a light beam, wherein physical address information and sector boundary information are recorded by wobbling, a wobbling frequency of a physical address information obtainable at a constant angular velocity on disk rotation is constant in a same zone and increases with zones toward the periphery, recorded data is arranged in grooves or on lands in accordance with sector boundary information.

(2) A disk type recording medium has the construction mentioned above (1) and is further characterized in that the disk type recording medium includes zones in which the number of sectors per rotation is not positive integer at a fixed length of a sector.

(3) A disk type recording medium has the construction mentioned above (1) and is further characterized in that recorded data is a groove of a zone boundary.

(4) A disk recording and reproducing device for recording and reproducing data on disk type recording media mentioned of any one of above (1) to (3) comprises rotation control means for rotating the disk type recording medium at a constant rotation speed, reference clock generating means for generating a reference clock corresponding to a wobbling frequency from physical address information, recording control means for recording data in a groove or on a land of the disk type recording medium on the basis of the reference clock and reproduction control means for reproducing data recorded in grooves or on lands on the basis of the reference clock.

(5) A disk recording and reproducing device for recording and reproducing data on the disk type recording media mentioned of any one of above (1) to (3) comprises rotation control means for rotating the disk type recording medium at a constant wobbling frequency in each zone from a physical address information, recording control means for recording data in a groove or on a land of the disk type recording medium on the basis of a specified reference clock and reproduction control means for reproducing data recorded in grooves or on lands on the basis of the reference clock.

(6) A disk recording and reproducing device for recording and reproducing data on the disk type recording media mentioned of any one of above (1) to (3) comprises a first rotation control means for rotating a disk type recording medium at a specified constant rotation speed, second rotation control means for rotating the disk type recording medium at a constant wobbling frequency in each zone from a physical address information, rotation control change-over moans for switching-over the first rotation control means to the second rotation control means and vice versa, reference clock generating means for generating a reference clock corresponding to a wobbling frequency from physical address information, recording control means for recording data in a groove or on a land of the disk type recording medium on the basis of the reference clock when the first rotation control means is selected and recording data in a groove or on a land of the disk type recording medium on the basis of a specified reference clock when the second rotation control means is selected and reproduction control means for reproducing data recorded in grooves or on lands of the disk type recording medium on the basis of the reference clock when the first rotation control means is selected and reproducing data recorded in grooves or on lands of the disk type recording medium on the basis of a specified reference clock when the second rotation control means is selected.

(7) A disk recording and reproducing device has the construction mentioned above of (4) or (6) and is further characterized in that the reference clock generating means is commonly used by the recording control means and the reproducing control means.

(8) A disk recording and reproducing device has the construction mentioned above of (4) or (6) and is further characterized in that the rotation control means include programmable frequency dividing means for generating reference frequencies corresponding to rotation control information of different frequencies for each zone from disk type recording medium.

(9) A disk recording and reproducing device has the construction mentioned above any one of (4) to (6) and is further characterized in that address converting means is provided for converting given logical address information to physical address information to a groove or a land and, the address converting means allocates ascending physical-address values to the disk starting from groove to land or land to groove for each zone in compliance with continuous ascending values of logical address.

(10) A disk recording and reproducing device has the construction mentioned above (9) and is further characterized in that the address converting means allocates address values to components in the order of groove to land in each zone and changes the order of land to groove for neighboring zone.

PREFERRED EMBODIMENT OF THE INVENTION

Several conventional optical disk devices will be described first for reference as follows:

Recently, optical disk devices are used as devices for realizing random recording and reproducing a large amount of data. The storage capacity of such optical disk devices can be increased by obtaining a constant linear recording density at any place on a disk by employing a constant linear velocity (CLV) method for accessing information on a disk at a constant relative velocity between a light pickup and an optical disk and at a constant recording data frequency. The CLV method makes the disk have a large capacity but a slow access time because circular tracks on the disk have different numbers of sectors per rotation in proportion to radial position and require correspondingly changing the rotation frequency.

On the other hand, the access time can be shorten by employing a constant angular velocity (CAV) method for accessing information on a disk at a constant recording frequency and a constant disk-rotation frequency. The CAV method can shorten the access time to information on the disk with no need for changing the rotation frequency of the disk. However, the disk has a constant number of sectors per rotation independent of radial positions on the disk and, therefore, the outer circular tracks have smaller linear recording density. The memory capacity of the disk can not be improved by the CAV method.

There has been applied a zone constant angular velocity (ZCAV) method for recording and reproducing data on a disk by rotating the disk at a constant rotation frequency, changing the recording data frequency step by step for respective radial zones. This method divides a surface of the disk into a plurality of radial zones in the radial direction from the outer circular tracks to the inner circular tracks. Respective radial zones have respective quantities of sectors. Each zone has a constant number of sectors per rotation in grooves formed therein. The outer radial zone has a larger quantity of sectors per rotation. Thus, the ZCAV method conducts zoning of the disk surface so as to obtain a substantially constant linear recording density on the disk independent of radial positions thereon. The capacity of the disk and the access time thereon can be thus improved.

Figure 1:
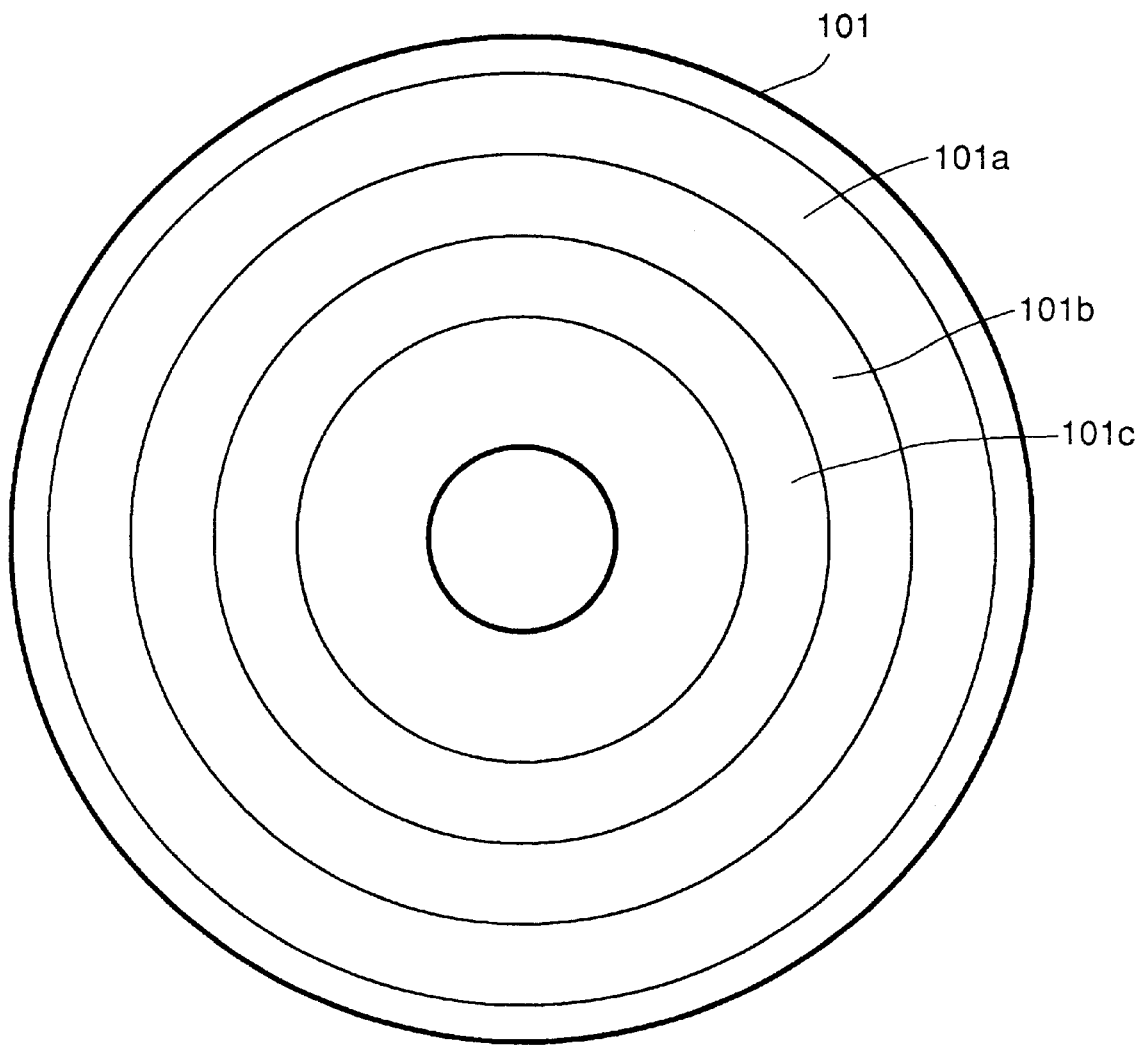
FIG. 1 is a mimic diagram showing a conventional disk according to ZCAV method.
Figure 2:
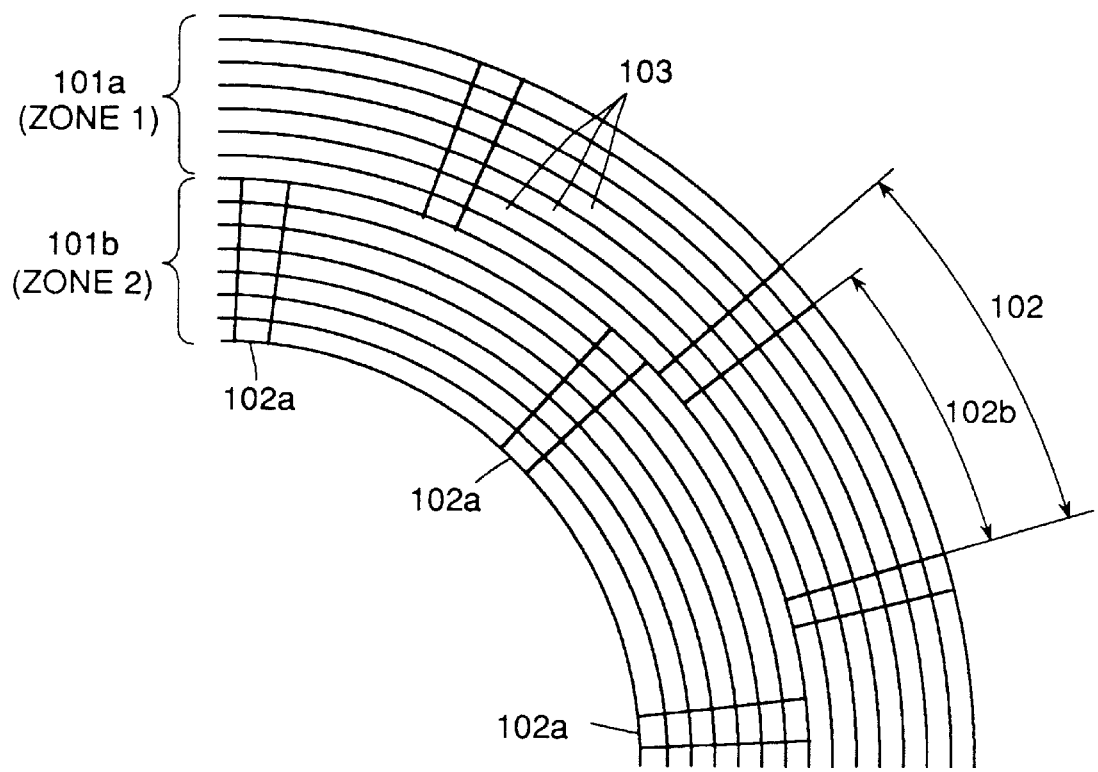
FIG. 2 is an enlarged mimic diagram showing a conventional disk.
Figure 3:
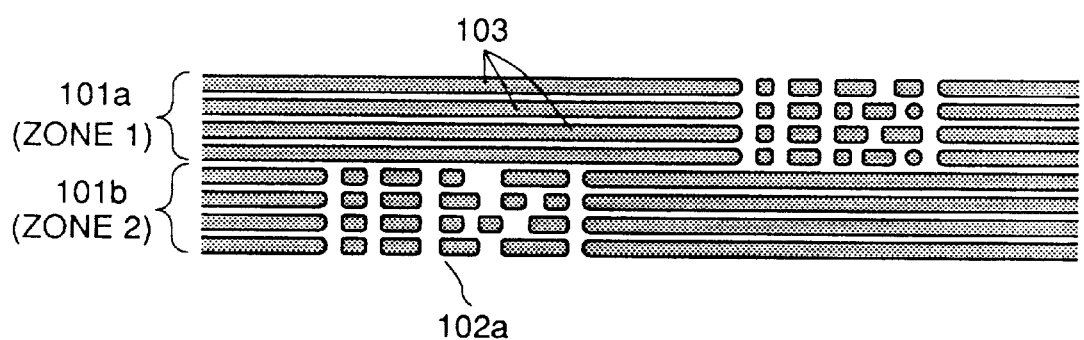
FIG. 3 is a further enlarged mimic diagram of a near-to-header portion of a conventional disk.

FIGS. 1 to 3 are typical illustration of a configuration of a disk type recording medium according to the above-mentioned ZCAV system.

In FIG. 1, a surface of a disk 101 is divided into three radial areas 101a (zone 1), 101b (zone 2) and 101c (zone 3) numbered from the outer periphery of the disk. Each zone includes a plurality of sectors per rotation of the disk. The number of sectors per groove per rotation of the disk is the same for grooves of the same zone.

FIG. 2 is a partial enlargement of the disk of FIG. 1. Each of areas 101a (zone 1) and 102b (zone 2) consists of a plurality of grooves 103. Each groove 103 is divided into a plurality of sectors 102 (per rotation of the disk). Each sector consists of a header 102a indicating a physical sector address on the disk and a data field 102b wherein recording data will be arranged. In each zone (area 101a or 102a), sectors 102 in respective grooves are radially aligned along boundaries on the disk.

FIG. 3 is a further enlargement of the header 102a and neighboring portions. The header 102a is of so-called pit-type that is embossed to shut off the groove by a physical sector address information and has been formed together with the groove in advance.

Figure 4:
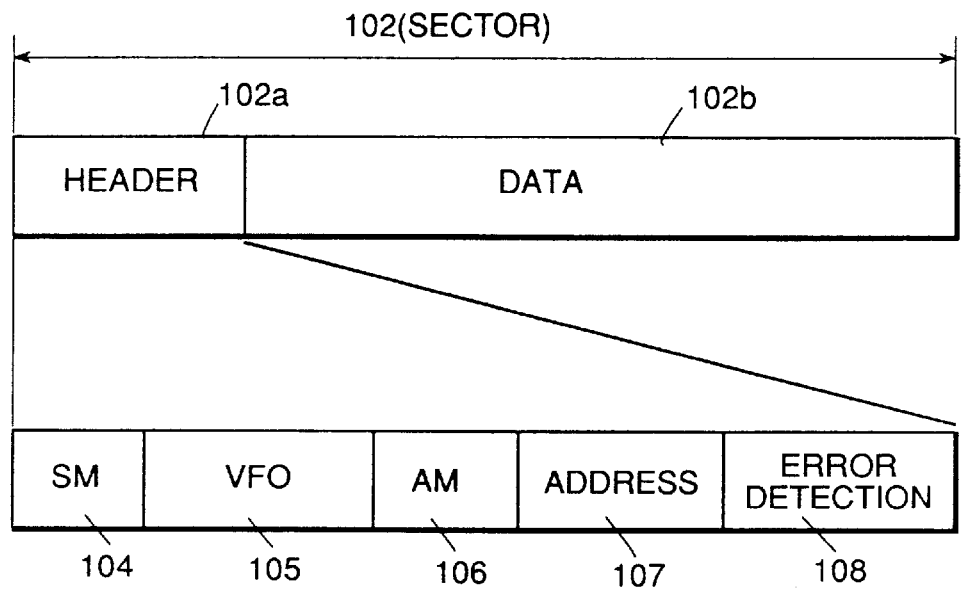
FIG. 4 shows a data structure of a sector of a conventional disk.

As shown in FIG. 4, the header 102a consists of a sector mark 104 indicating the beginning of the sector, a VFO field 105 for pulling a phase by a phase locked loop (PLL) for generating a clock necessary for reproducing the physical sector address, an address mark 106 indicating the beginning of the physical sector address, an address field 107 being a physical sector address, an error detection field 108 for detecting an error.

Figure 5:
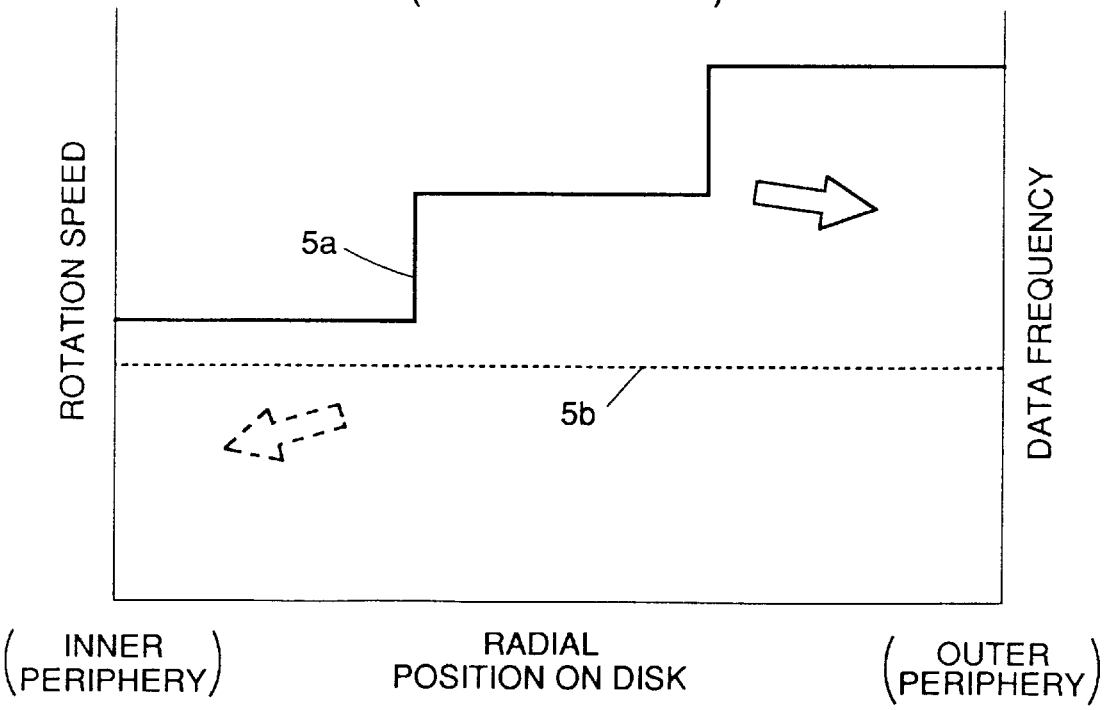
FIG. 5 shows a data frequency characteristic of each zone of a conventional disk when recording and reproducing operation with it.

FIG. 5 depicts how the above-mentioned disk of the ZCAV system is treated in a disk recording and reproducing device. The disk is rotated at a constant rotation frequency (as indicated by a dotted line 5b in FIG. 5) independent of its radial position (in other words, the outer zone has a higher linear velocity). Furthermore, a recording or reproducing data frequency relating to a data transfer rate changes zone by zone (as shown by a solid line 5a) and recording and producing clock signals are generated and applied for changing a data frequency higher at the outer peripheral side of the disk. Accordingly, the access time for the disk may be shortened since there is no need of changing the disk rotation frequency. In addition, the linear recording density can be kept at a substantially constant on any radial position on the disk by increasing the data frequency with an increase of the linear velocity at the outer zones on the disk.

Various kinds of disk devices have been selectably used for applications. For example, the disk devices of the CLV system are applied for recording successive data (e.g. , image data) that requires a large storage capacity rather than accessing speed. On the contrary, the disk devices of ZCAV system are applied for recording and reproducing discrete data randomly on the disk in a computer wherein high-speed random access to the disk is necessarily required. However, these types of available disks are quite different from each other in their formats. Manufacturers must produce various types of differently formatted disks that may confuse users.

A conventional disk recording and reproducing device for use with a conventional disk of the ZCAV method can realize high-speed access to information on the disk but has a decreased data frequency, e.g., a reduced transfer rate at the inner radial side of the disk as shown in FIG. 5. The ZCAV system disk is inferior to the CLV system disk in data transfer speed when the disk is used for transferring successive data (e.g., image data) or for backing-up the data.

Furthermore, the disk rotation at its inner side in the ZCAV system is lower than that in the ZCLV system since the former system rotates the disk at a constant rotation frequency and the latter system increases the disk rotation at the inner side than at the outer side. This means that the ZCAV system has a longer time to access a desired sector in a rotation of the disk in comparison with the ZCLV system.

A disk recording and reproducing device which is capable of working with differently formatted disks may be manufactured but is very expensive.

In the disk of the ZCAV system, both side boundaries of sectors (minimal unit to be recorded and reproduced) are aligned into radially extending lines as shown in FIG. 2 and 3. The number of sectors per rotation (per groove) is the same for every groove in the same zone on the disk. This arrangement is needed because the pre-recorded pit-type header 102a may affect data field 102b with a cross-talk if it neighbors with the data field 102b. Namely, the headers 102a shall neighbor with each other arid the data fields 102b shall always neighbor with each other to assure reliable data recording therein.

The radial alignment of sectors may, however, cause limiting the linear recording density lower than the ability of the disk or the disk recording and reproducing device since the number of sectors having a specified physical length (for a specified capacity) per rotation of the disk must be a positive integer.

For example, it is assumed that a disk or a device has the recording density of 0.5 $\mu$m per bit, 1 sector is composed of 20000 bits and has a physical length 10 mm. When the sectors of 10 mm in length are allocated to a radial zone at radial position of 30 mm, the circumference is 188.5 mm and the number of allocatable sectors of 10 mm in physical length is about 18.85 (188.5 mm÷10 mm). A positive integer is 18. Accordingly, 18 sectors shall be practically allocated. With 18 sectors per rotation, the bit size at a radius of 30 mm is determined to be 0.523 $\mu$m/1 bit. This figure is lower than by about 5% the maximal recording density (0.5 $\mu$m/1 bit) of the disk or the device. This means the reduction of memory capacity of the disk.

It is possible to avoid occurrence of cross-talk from a header to data field by radially aligning sector boundaries in each zone. However, neighboring zones are not aligned at their radial sector boundaries in radial direction on the disk. Namely, two zones (e.g., the areas 101a and 101b shown in FIG. 2) are arranged in such a way that a header of one zone is faced to a data field of the other zone. Consequently, cross-talk may occur between the header of one zone (102a) and a data field (103) of the other zone. Thus, boundary grooves of neighboring zones cannot be used on the disk, resulting in reduction of the disk memory capacity.

A disk shown in FIG. 3 is used for recording data on its grooves. The capacity of this disk can be increased if a pitch between grooves is reduced. However, it is impossible to reduce a distance between grooves since the neighboring headers may interfere with each other.

(Embodiment 1)

Figure 6:
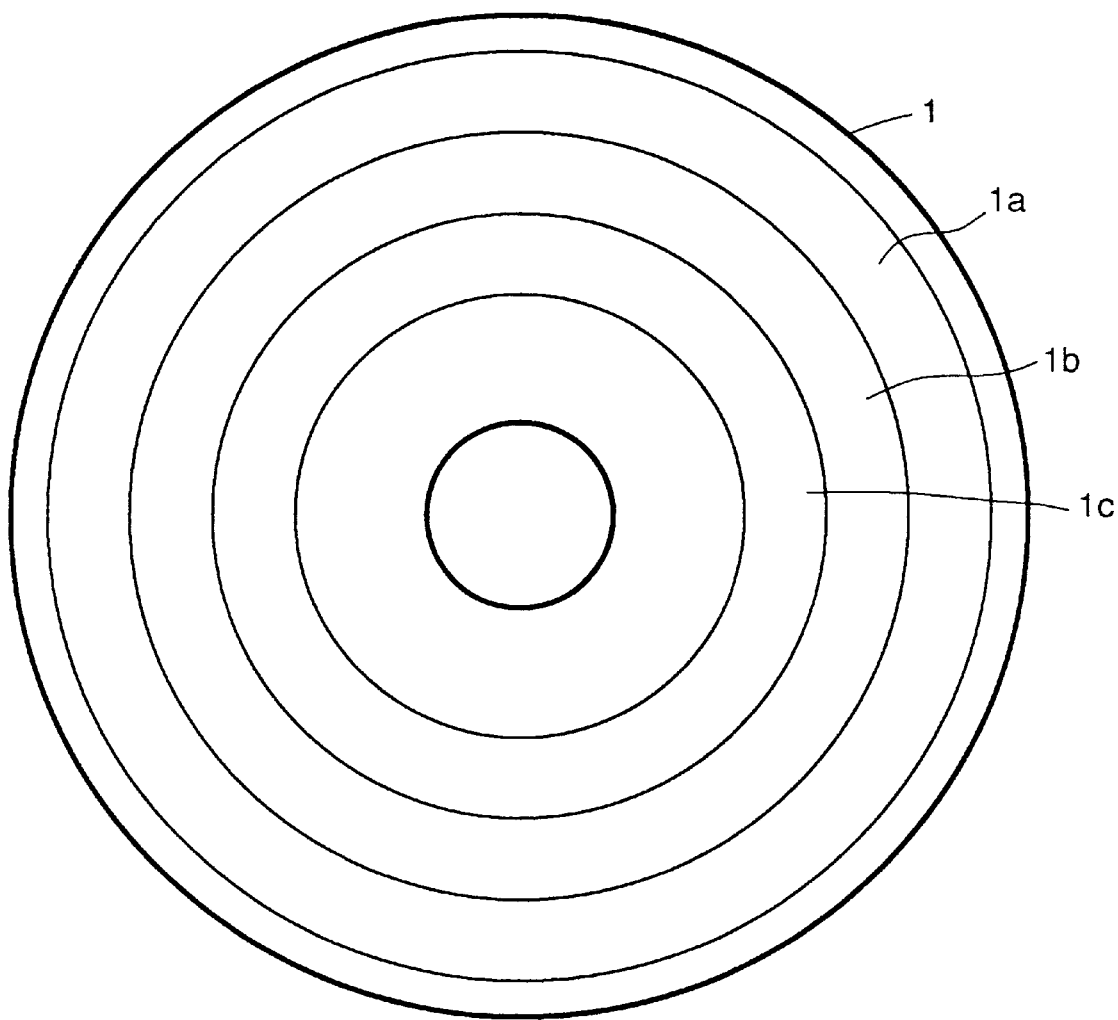
FIG. 6 is a mimic diagram showing areas of a disk type recording medium according to embodiments 1 and 2 of the present invention.
Figure 7:
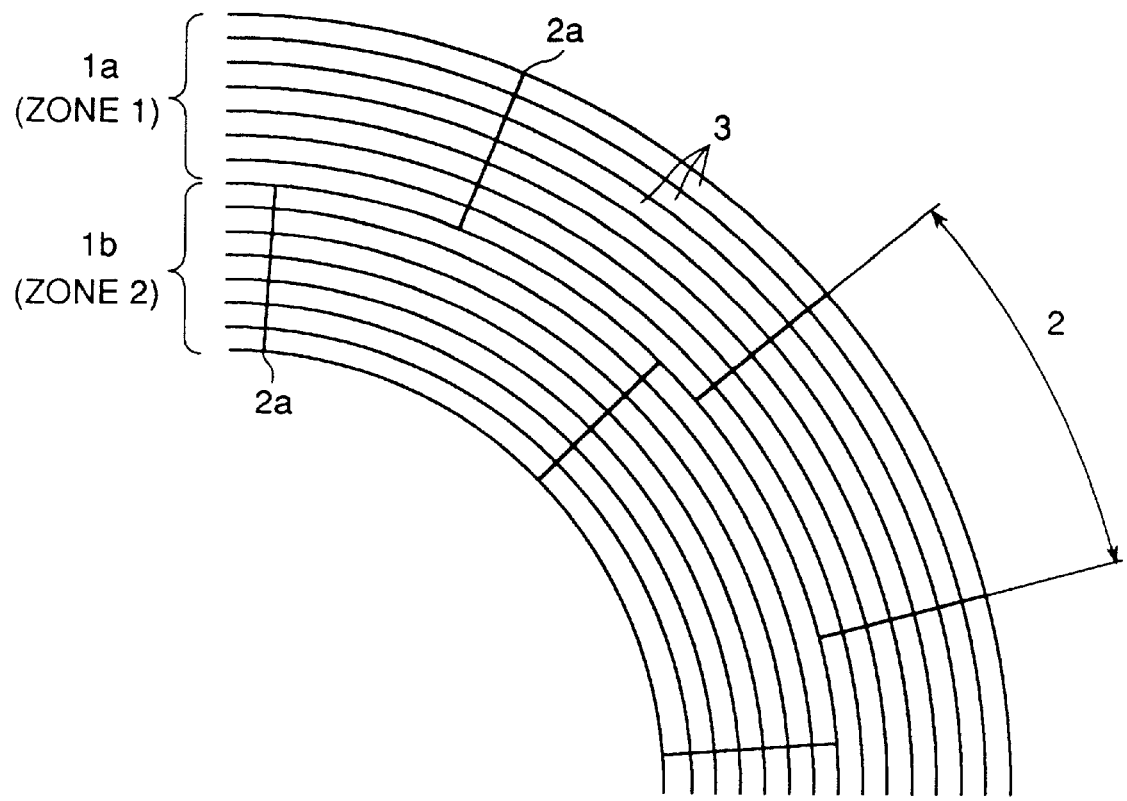
FIG. 7 is an enlarged mimic diagram showing areas of a disk type recording medium according to embodiment 1 of the present invention.
Figure 8:
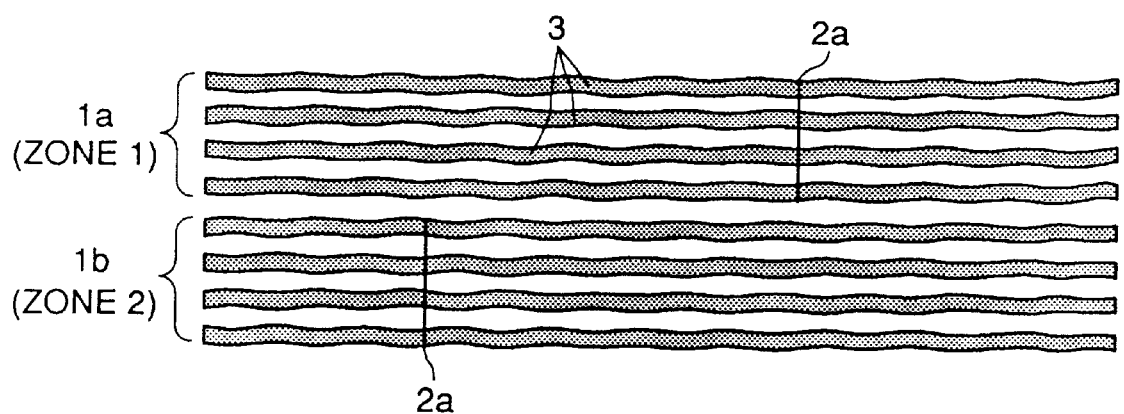
FIG. 8 is a further enlarged mimic diagram showing areas of a disk type recording medium according to embodiment 1 of the present invention.

A disk type recording medium according to an embodiment 1 of the present invention is described as follows:

FIGS. 6 to 8 illustrate a configuration of a disk type recording medium according to the present invention.

In FIG. 6, a surface of a disk 1 is divided into 3 zone areas 1a, 1b and 1c numbered from the outer periphery of the disk. Each zone includes a plurality of sectors per rotation of the disk. The number of sectors per rotation of the disk is the same for grooves of the same zone.

FIG. 7 is a partial enlargement of the disk of FIG. 6. Each of areas 1a (zone 1) and 1b (zone 2) consists of a plurality of grooves 3. Each groove 3 is divided by sector-boundaries 2a into a plurality of sectors 2 (per rotation of the disk). In each zone, sectors 2 in respective grooves are radially aligned along sector-boundaries 2a on the disk. An outer zone has more quantity of sectors than an inner zone. Grooves 3 are spiral or concentric on the disk.

FIG. 8 is a further enlargement of areas 1a and 1b divided by respective sector-boundaries 2a on the disk. Grooves 3 are previously given physical address information that indicates real address values of sectors in respective grooves in the same area. This information is subjected to frequency modulation after two-phase mark modulation and previously formed by wobbling in the direction a light beam follows. The physical address information forms pre-recorded information. Wobble frequencies used for pre-recording this information are an intermediate band between recording information band and tracking servo band. Center frequency of the wobbled band is constant for grooves in the sectors of the same zone (area 1a or 1b or 1c) when the disk rotates at a constant rotation speed. The outer zone has a higher wobble frequency than that of the inner neighboring zone. Namely, among zones 1–3, the zone 1 has a highest wobble frequency for grooves therein.

Figure 9:
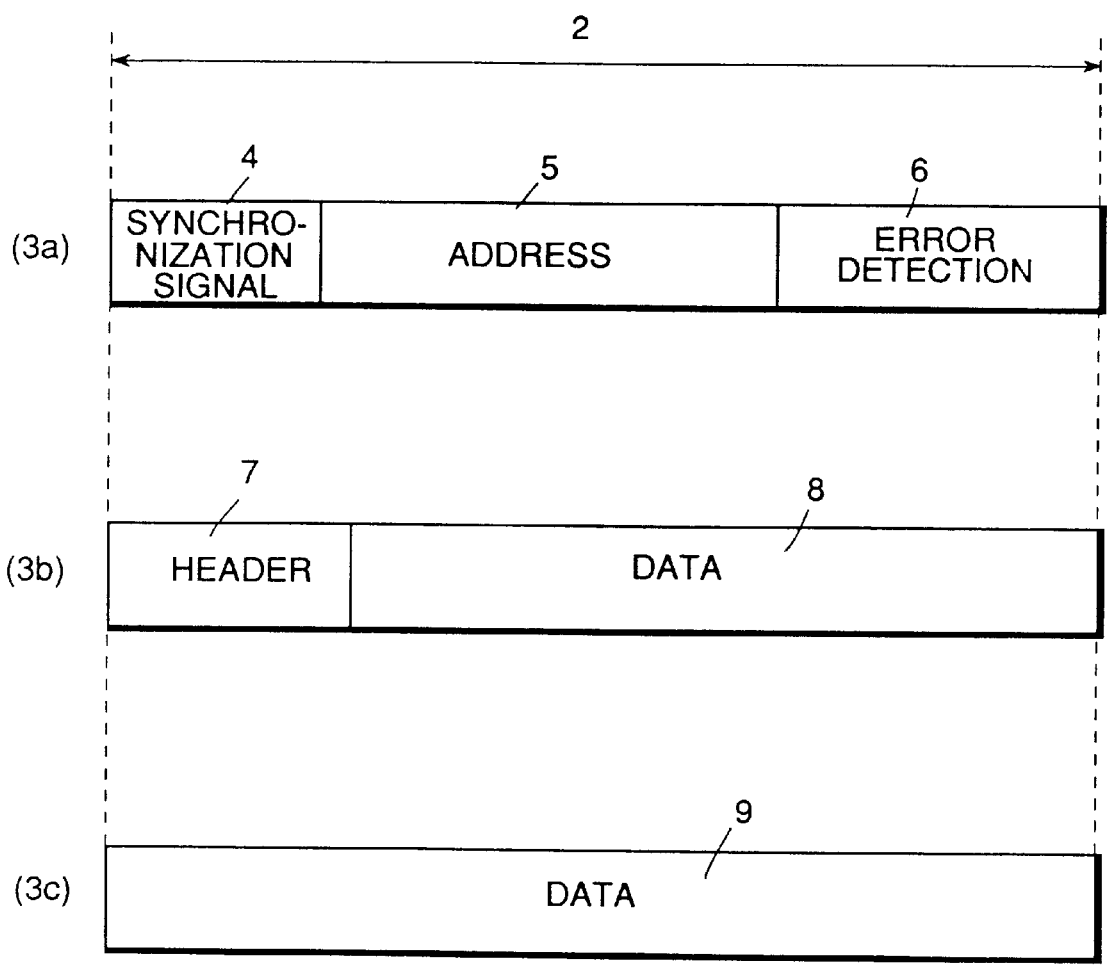
FIG. 9 shows a data structure of a sector of disk type recording medium according to embodiments 1 and 2 of the present invention.

FIG. 9 shows a typical allocation of an above-mentioned sector 2. In FIG. 9, a sector 3a is allocated to a string of information composing a pre-recorded information obtainable by wobbling grooves in the direction light beam follows and sectors 3b and 3c are allocated respectively to exemplified information strings of information to be recorded.

By way of example, a case that a sector of pre-recorded information and a sector of recorded information correspond to each other (1:1) on the disk will be described below.

As shown in FIG. 9, the sector 3a of the pre-recorded information consists of a synchronization signal 4 indicating the beginning of the pre-recorded information sector, an address field 5 indicating an actual address and an error detection field 6 for detecting address field error. This pre-recorded information is recorded by wobbling a whole surface of disk to form continuous tracking grooves to be wobbled. Sector boundaries 2a drawn for explanation correspond to synchronization signals 4.

On the other hand, recordable information (3b in FIG. 9) consists of a header 7 including the sector address and data field of recorded data (e.g., 4 kb) and an error detection correction code. The header 7 is formed on a groove in the form of an information array (not in the form of bits) as shown in FIG. 4. With the sector address in the header 7, the sector can be reliably accessed than the case of using only the physical address information in the address field 5. Alternatively, the sector may be composed of only data field 9 (3c in FIG. 9) for recording data and error detection code, omitting header portion. In this case, data utilization is increased arid the storage capacity can be further increased. There is always a constant relation between a wobble frequency of pre-recorded information and a frequency (data rate) of information to be recorded on a groove. Namely, this means that physical address information is assigned as the sector address to the sector 2 and a specified amount of recorded data is arranged in this sector.

Figure 10:
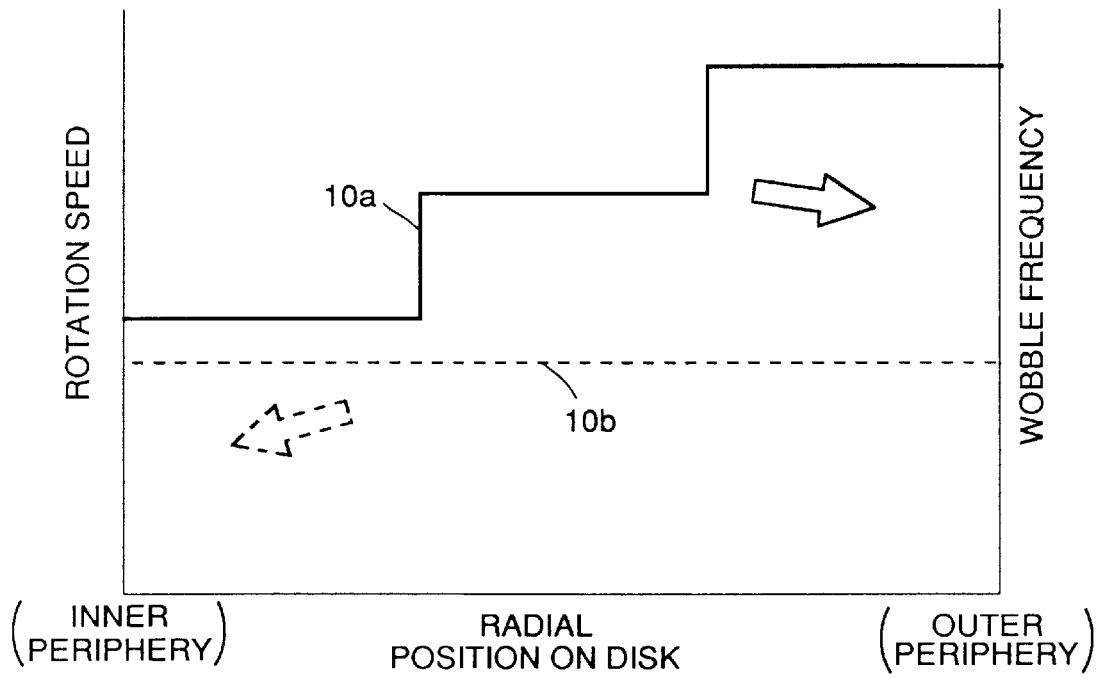
FIG. 10 is a characteristic diagram showing a relationship between disk zone rotation speeds and wobble frequencies when recording and reproducing by ZCAV method on a disk type recording medium according to embodiments 1 and 2 of the present invention.
Figure 11:
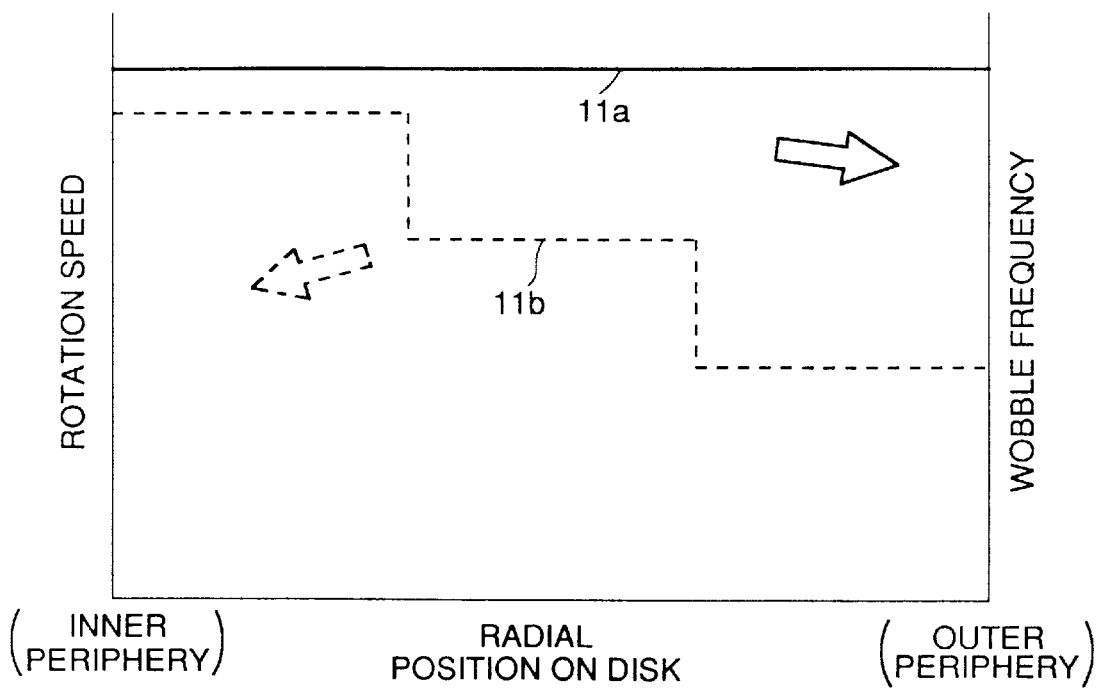
FIG. 11 is a characteristic diagram showing a relationship between disk zone rotation speeds and wobble frequencies when recording and reproducing by ZCLV method on a disk type recording medium according to embodiments 1 and 2 of the present invention.

This disk with physical address information pre-recorded allows a CPU to access any desired area (even unrecorded) and to record and reproduce data as shown in FIGS. 10 and 11.

FIG. 10 depicts a case that the disk according to present invention works in the ZCAV system. In this case, a rotation speed (frequency) of the disk is constant independent of a radial position of the disk as shown by a dotted line 10b in FIG. 10. A center wobble frequency of pre-recorded information containing physical addresses is constant as shown by a solid line 10a in the same zone. The outer zone has a higher center wobble frequency. Accordingly, an outer peripheral zone can have a higher constant frequency of recording information in accordance with wobble frequency of pre-recorded information. This means that the outer peripheral zone can be used for recording and reproducing data at an increased number of sectors per rotation. The disk can also be adapted to work with ZCAV system changing recording speed depending to radial position of the disk.

FIG. 11 depicts another case that the disk of the present invention is used as the ZCLV (Zoned Constant Linear Velocity) system whereby recording and reproducing data on the disk is conducted by an optical pickup whose relative velocity has a constant ratio to the disk, changing the disk rotation speed step by step depending on radial positions of the disk. In this case, the disk rotates so that a center wobble frequency 11a (shown by a solid line) of pre-recorded information can be maintained at a specified value in each zone. Consequently, the disk can be adapted to work with ZCLV system having a lower rotation speed in the outer peripheral zone and a constant rotation speed in each zone (working with as CAV system), as shown a broken line 11b in FIG. 11. The constant wobble frequency of pre-recorded information means that the frequency of recording information is constant, therefore, the outer peripheral zone can be used for recording and reproducing data at an increased number of sectors per rotation. The disk can also be adapted to work with ZCAV system changing recording speed depending to radial position of the disk.

Thus, the same disk is commonly used for realizing operations of two different systems ZCAV (FIG. 10) and ZCLV (FIG. 11).

The above-mentioned disk does not use a pit-form header that may affect by cross-talk to neighboring grooves. Namely, no cross-talk may occur between grooves at the boundary of two neighboring zones on the disk wherein recorded information can be, therefore, stored on neighboring grooves at the boundary of zones. This may increase the utilization of grooves of the disk.

Figure 14:
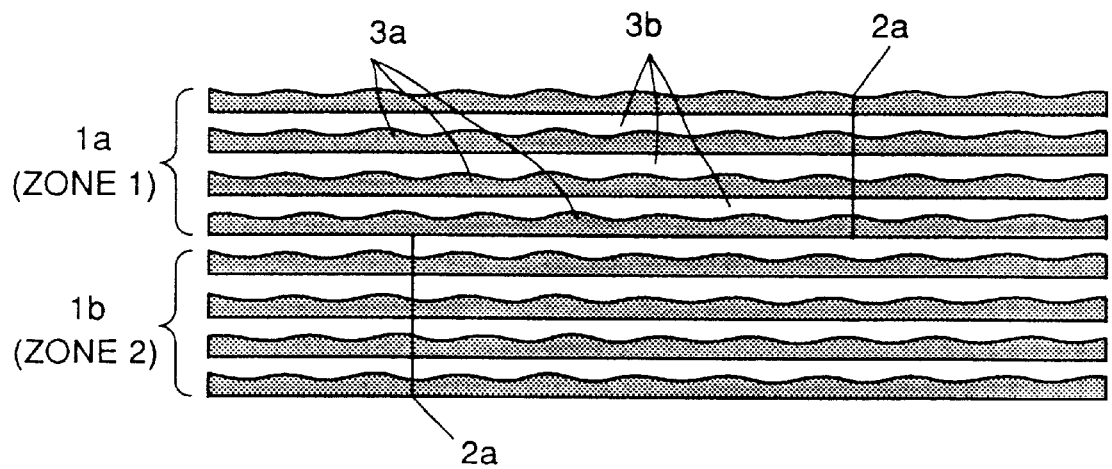
FIG. 14 is an enlarged mimic diagram showing areas of another disk type recording medium according to embodiment 1 of the present invention.

FIG. 14 is a view for explaining another example of a disk type recording medium which is the embodiment 1 of the present invention. While the disk of FIG. 8 is wobbled at both side-walls and stores recorded information on each groove, the disk of FIG. 14 is wobbled only at one side-wall and stores recorded information in grooves 3a as well as lands 3b between the grooves 3a. Namely, this disk can realize so-called land/groove recording thereon.

In practice, physical address information is subjected to two-phase mark modulation and then frequency modulation similarly to the case of FIG. 8. The physical address information is previously recorded (formed) on a groove 3 on the disk of FIG. 14 by wobbling at one side-wall thereof to form the pre-recorded information thereon. Consequently, each pair of a groove 3a and a land 3b has common pre-recorded information with the same address. Sectors of grooves 3a and lands 3b in the same zone (1 or 2) are radially aligned along sector boundaries 2a on the disk. Wobble frequencies used for pre-recording are an intermediate band between recording information band and tracking servo band. Center frequency of the wobble band is constant for grooves in the same zone (area 1a or 1b or 1c in FIG. 6) when the disk rotates at a constant rotation speed. The outer zone has a higher wobble frequency than that of the inner neighboring zone.

The above-described construction may increase the track density (i.e., recording density in a radial direction) of the disk in addition to the features described referring to FIG. 8. Accordingly, this enables the disk to have a further increased memory capacity.

(Embodiment 2)

A disk type recording medium according to the second embodiment of the present invention is as follows:

Similarly to the first embodiment described with reference to FIG. 6, a disk of the second embodiment of the present invention has a surface divided into three radial zones 1 (area 1a), 2 (area 1b) and 3 (area 1c) numbered from the outer periphery of the disk. Each zone consists of a particular number of sectors per rotation of the disk. Each zone has the same number of sectors per rotation.

Figure 12:
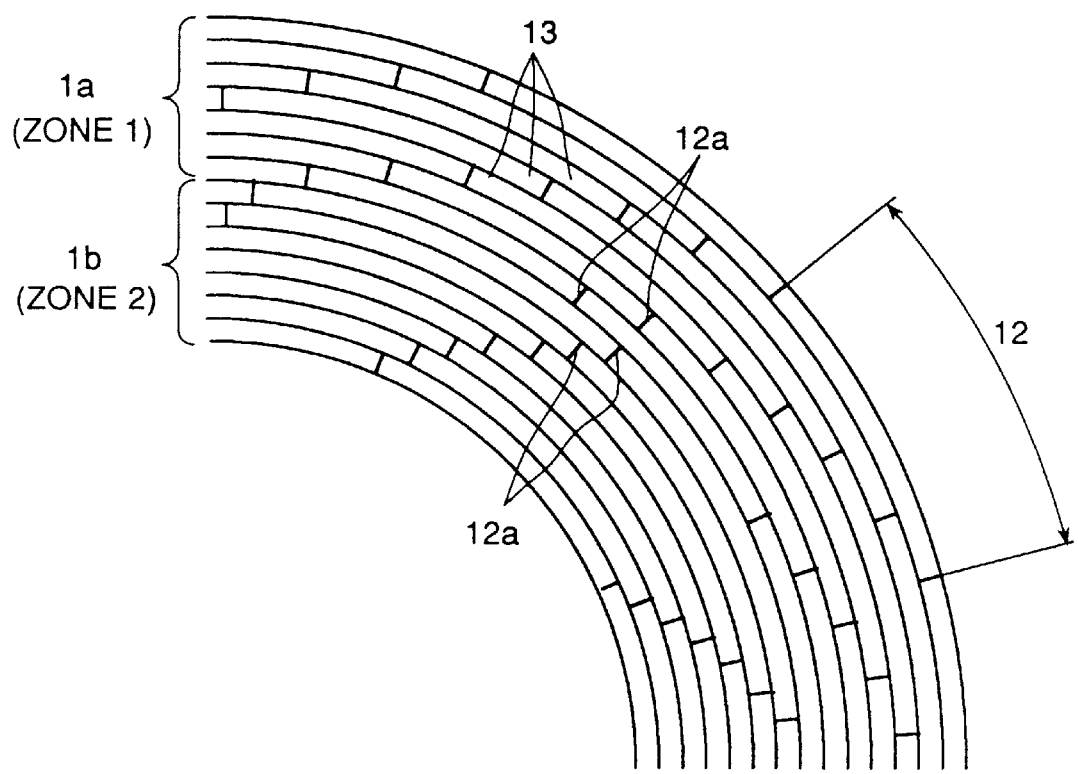
FIG. 12 is an enlarged mimic diagram showing areas of another disk type recording medium according to embodiment 2 of the present invention.

FIG. 12 is an enlarged view of a part of the disk. Each of areas 1a (zone 1) and 1b (zone 1b) consists of a plurality of grooves 13. Each groove 13 has a plurality of sectors 12 per rotation of the disk. In each zone and between different zones, the sectors 12 are differently arranged in different grooves, i.e., sector boundaries 12a of the sectors in each zone are not radially aligned. Namely, the number of sectors per rotation of the disk at a constant physical length of the sectors does not take a positive integer. Consequently, boundaries 12a of neighboring sectors does not match with each other in the radial direction on the disk. This can be realized because the disk has no conventional pit-type header that may affect neighboring grooves by cross-talking. In comparison with a conventional disk, this disk can allocate 18.85 sectors that corresponds to a standard packing density (lines/inch) to a radial ring position 30 mm thereon. The outer zone has the larger number of sectors per groove than that the inner neighboring has. Grooves are formed to be spiral or concentric on the disk.

Figure 13:
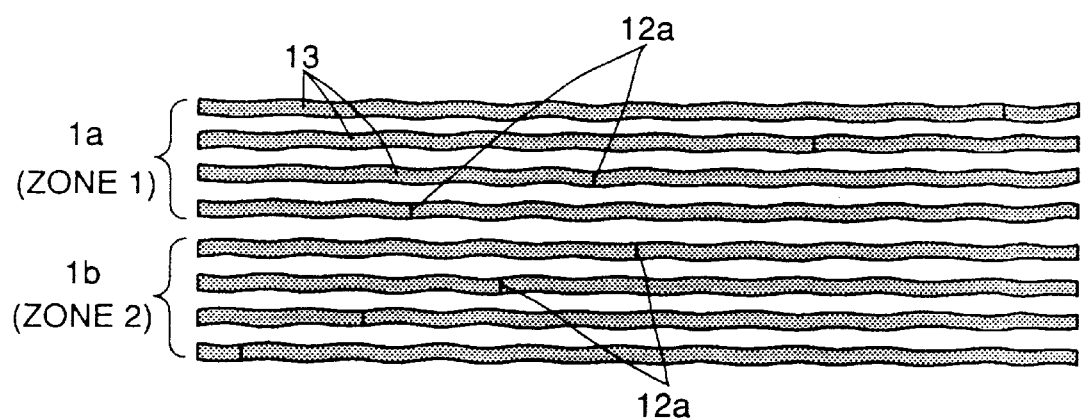
FIG. 13 is a further enlarged mimic diagram showing areas of another disk type recording medium according to embodiment 2 of the present invention.

FIG. 13 is a further enlarged typical view of areas of the disk type recording medium according to the present invention. Grooves 13 have records of physical address information indicating actual address values for sectors of each groove. This information is subjected to two-phase mark modulation and then frequency modulation and is previously recorded on each groove by wobbling in the following direction of a light beam on the disk. Wobble frequencies used for recording the pre-recordable information are within an intermediate band between recording information band and tracking servo band. Center frequency of the wobbled band is constant for grooves in the same zone (area 1a or 1b or 1c) when the disk rotates at a constant rotation speed. The outer zone has a higher wobble frequency than that of the inner neighboring zone. As described above, sector boundaries 12a can not be aligned with each other between neighboring grooves even in the same zone and between the neighboring zones. Assignment of sectors 12 can be done in the same way as described before with reference to FIG. 9.

This disk with pre-recorded physical address information allows a CPU to access any desired area (even unrecorded) and to use in common by both systems ZCAV (FIG. 10) and ZCLV (FIG. 11). In this case, it is not needed to make the number of sectors per rotation of the disk be a positive integer. This enables the full use of recording linear density performance of the recording medium in the recording and reproducing system. Namely, this disk type recording medium can have an increased data utilization.

Figure 15:
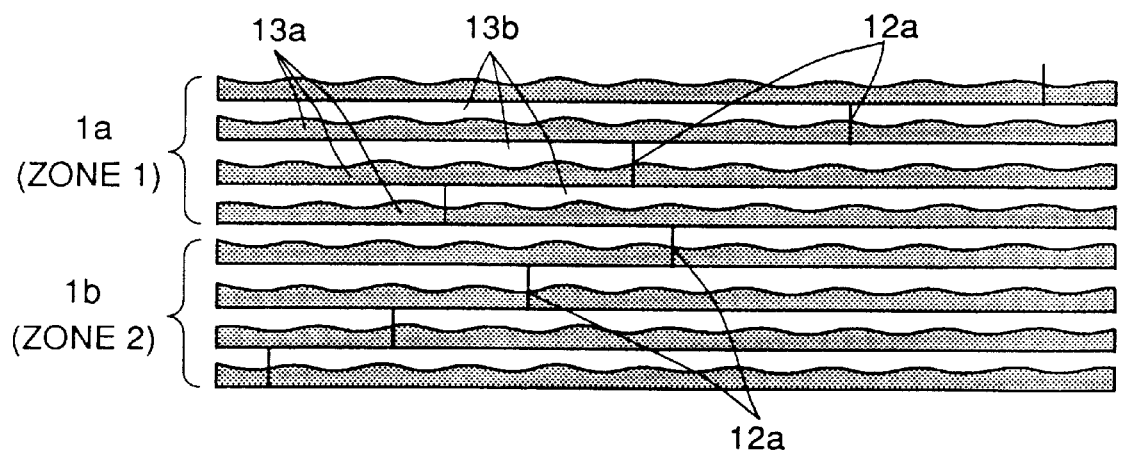
FIG. 15 is an enlarged mimic diagram showing areas of another disk type recording medium according to embodiment 2 of the present invention.

FIG. 15 depicts another example of disk type recording medium according to the second embodiment of the present invention. While the disk of FIG. 13 is wobbled at both side-walls and stores recorded information on each groove, the disk of FIG. 15 is wobbled only at one side-wall and stores recorded information in grooves 13a and on lands 13b between the grooves 13a. Namely, this disk can realize so-called land/groove recording thereon.

In practice, physical address information subjected to two-phase mark modulation and then frequency modulation (similarly to the case of FIG. 13) and then is recorded on a groove 13a on the disk of FIG. 15 by wobbling at one side-wall thereof to form the pre-recorded information thereon. Consequently, each pair of a groove 13a and a land 13b has common pre-recorded information with the same address. Sectors of grooves 13a and lands 13b, which are given a common pre-recorded information address in the same zone, are radially aligned with each other along sector boundaries 12a on the disk. A groove and a land, which are neighboring to each other without a common pre-recorded information address, are not aligned with each other in the radial direction on the disk. Wobble frequencies used for pre-recording are within an intermediate band between recording information band and tracking servo band. Center frequency of the wobble band is constant for grooves in the same zone (area 1a or 1b or 1c) when the disk rotates at a constant rotation speed. The outer zone has a higher wobble frequency than that of the inner neighboring zone.

In addition to the advantageous features described with reference to FIG. 13, the disk can have an increased track density (i.e., recording density in its radial direction). Accordingly, the disk can attain a further increased storage capacity.

(Embodiment 3)

Figure 16:
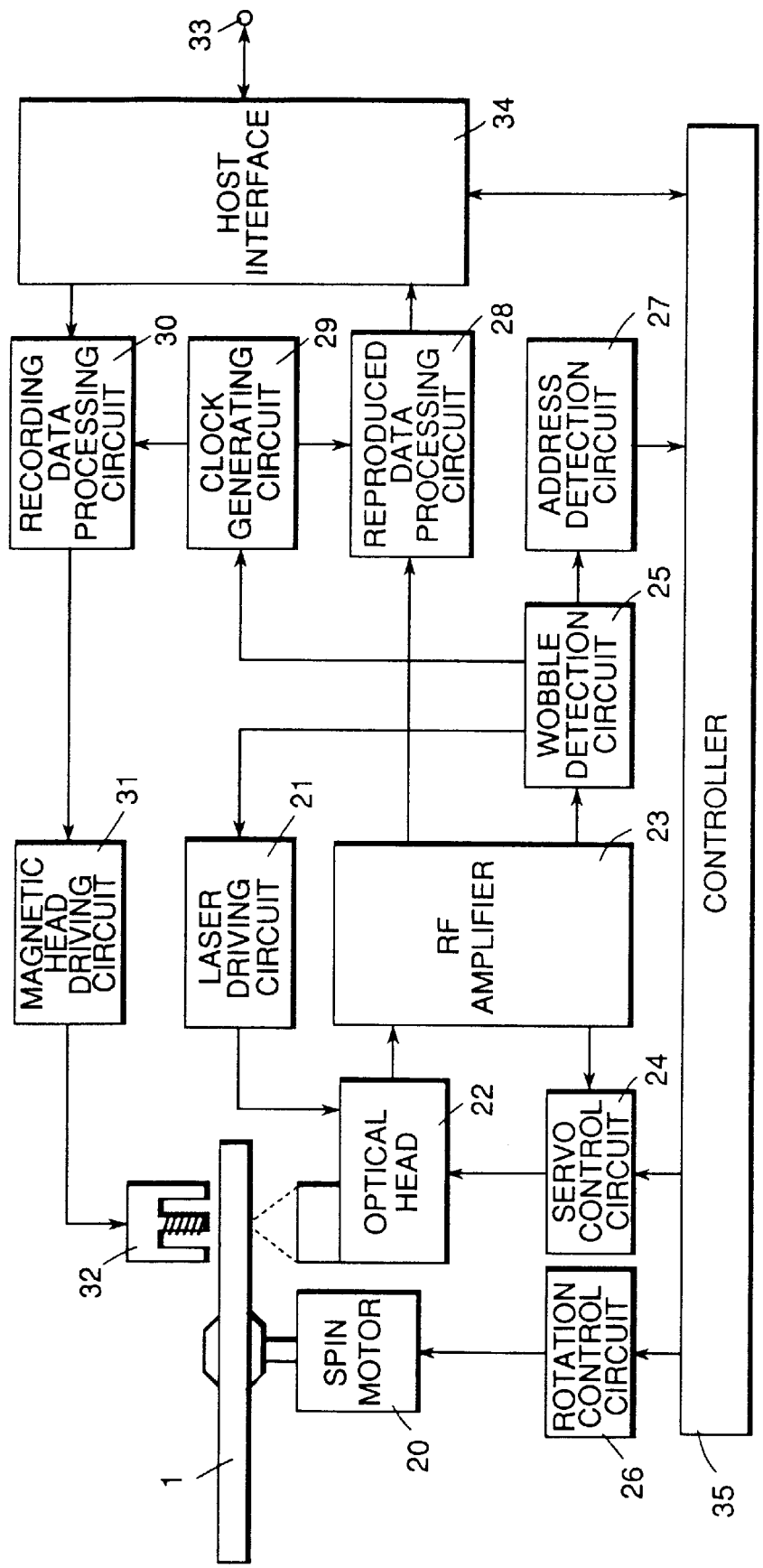
FIG. 16 is a construction view of a disk recording and reproducing device according to embodiment 3 of the present invention.

A disk recording and reproducing device which is a third embodiment of the present invention will be described as follows:

FIG. 16 is a construction view of a ZCAV-type disk recording and reproducing device for recording and reproducing data on a magneto-optical disk that is a disk type recording medium according to the embodiment 1 or 2 (without a header in recorded information) of the present invention. This device comprises a spin motor 20 for supporting and rotating a magneto-optical disk 1; an optical head 22 for generating a laser beam in response to a laser driving signal from a laser driving circuit 21, focusing the laser beam on a desired radial position on the rotating magneto-optical disk 1, detecting light reflected from the disk when reproducing data thereon or applying a laser beam having higher strength to the disk when recording data thereon; a radio-frequency (RF) amplifier 23 for amplifying the detected signal from the optical head 22 to produce a reproduced data signal, a wobble signal, a servo tracking error signal or other specially designated signal; a magnetic head 32 for applying a magnetic field to the magneto-optical disk 1 when recording data thereon; a rotation control circuit 26 for controlling a constant rotation speed of the spin motor 20; a servo control circuit 24 for controlling the focusing and tracking operations of the optical head 22 and controlling a feed motor (not shown) according to a servo tracking error signal from the RF amplifier 23 and an instruction signal from a controller 35; a wobble detection circuit 25 for detecting a wobble signal from the servo tracking error signal from the RF amplifier 23; an address detection circuit 27 for detecting a physical address for locating the position of the laser beam on the magneto-optical disk by demodulating and decoding the wobble signal from the wobble detection circuit 25; a host interface 34 for receiving a reproducing/recording instruction from a higher level host and receiving/transmitting data from/to the host through a terminal 33; recording data processing circuit 30 for generating necessary recording data from the data received from the host interface 34 by adding error correction information thereto and modulating the prepared data into data adapted to be recorded according to a recording clock signal from the clock generating circuit 29; a magnetic head driving circuit 31 for driving the magnetic head 32 to produce a magnetic field suitable for the recording data from the recording data processing circuit 30; a reproduced-data processing circuit 28 for demodulating the reproduced data signal from the RF amplifier 23 and transmitting error-corrected reproduced data to the host interface 34; and a controller 35 for controlling the components of the disk recording and reproducing device. The above-mentioned components are interconnected as shown in FIG. 16.

Figure 17:
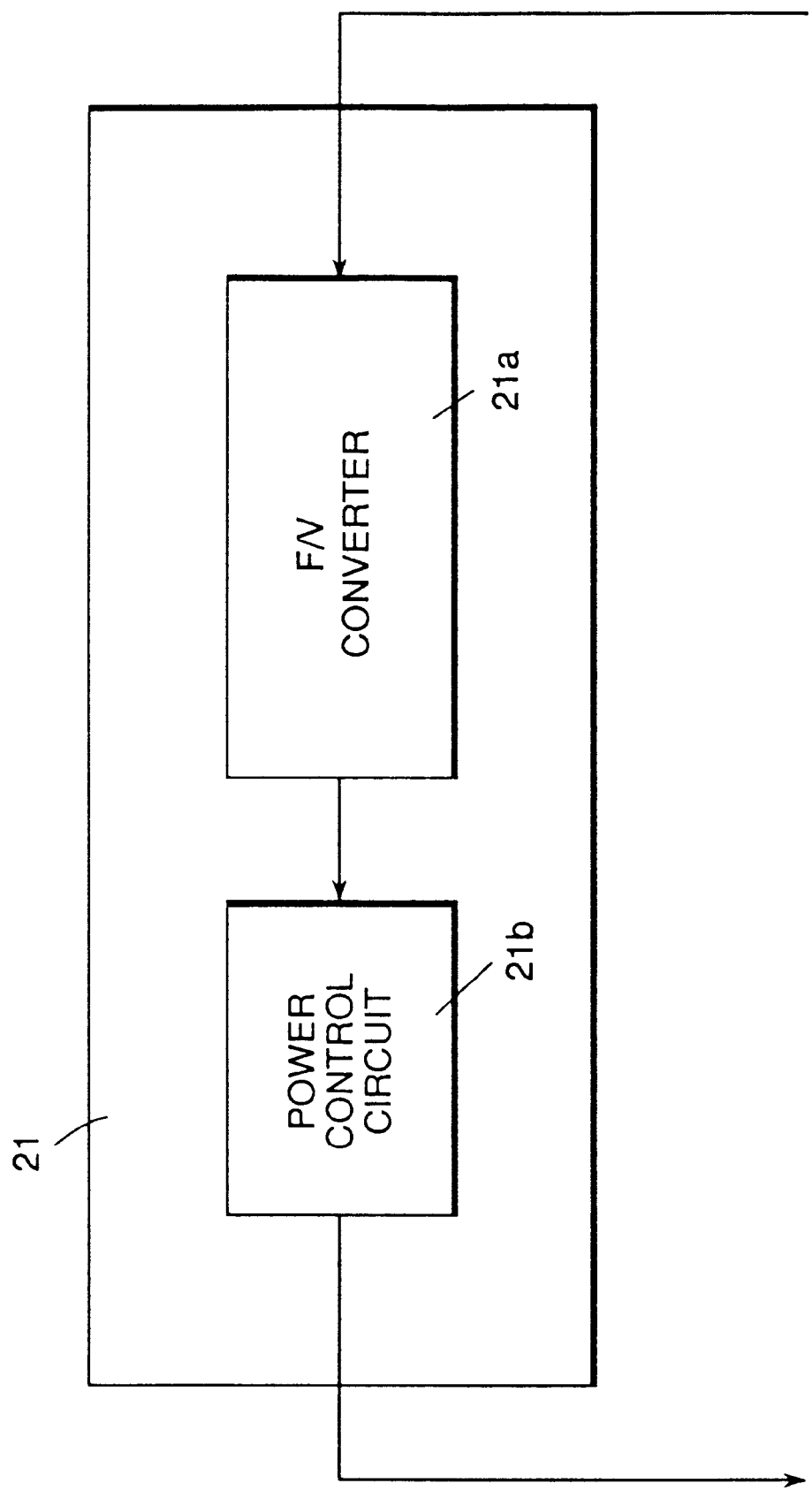
FIG. 17 is a construction view of a laser driving circuit of a disk recording and reproducing device according to embodiments 3 and 4 of the present invent ion.

FIG. 17 is a detailed construction view of the laser driving circuit 21. This laser driving circuit includes a frequency-to-voltage (F/V) converter 21a for converting a frequency of wobble signal detected wobble detection circuit 25 into a voltage and a power control circuit 21b for controlling power of light beam according to the voltage from the F/V converter.

Figure 18:
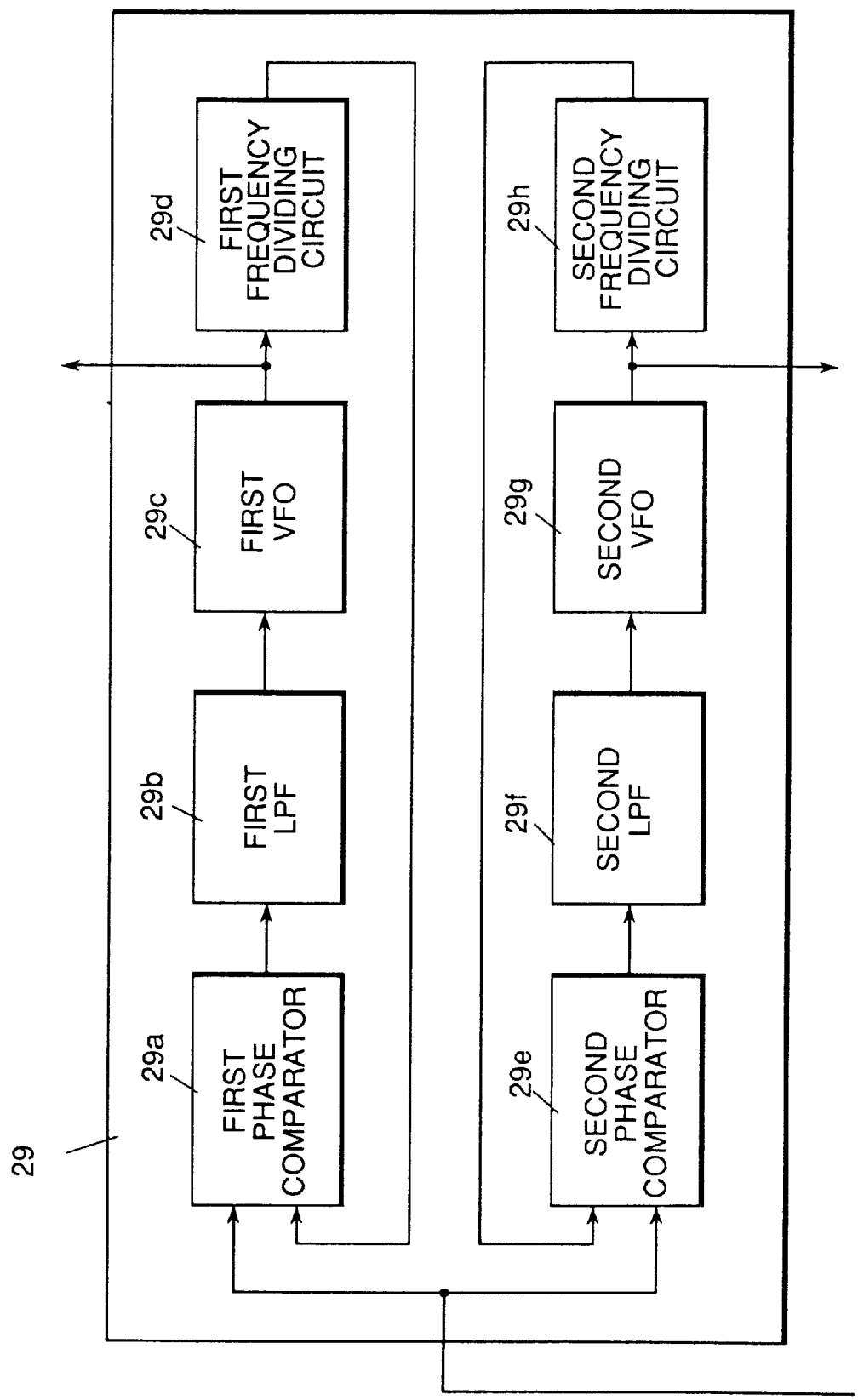
FIG. 18 is a construction view of a clock generating circuit of a disk recording and reproducing device according to embodiments 3 and 4 of the present invention.

FIG. 18 is a detailed construction view of the clock generating circuit 29. This clock generating circuit comprises: a recording reference-clock generating portion, which includes a first phase comparator circuit 29a for comparing a wobble signal extracted by the wobble detection circuit 25 with a demultiplied signal from a first frequency dividing circuit 29d, a first low-pass filter (LPF) 29b for cutting off a high frequency component of a phase difference signal from the first phase comparator 29a, a first voltage-frequency oscillator (VFO) 29c for generating a reference recording clock signal according to a phase difference signal from the first LPF 29b and a first frequency dividing circuit 29d for dividing a frequency of the first VFO 29c to a frequency corresponding to a wobble signal, and a reproduction reference-clock generating portion, which includes a second phase comparator circuit 29e for comparing a wobble signal extracted by the wobble detection circuit 25 with a divided signal from a second frequency dividing circuit 29h, a second low-pass filter (LPF) 29f for cutting off a high frequency component of a phase difference signal from the second phase comparator 29e, a second voltage-frequency oscillator (VFO) 29g for generating a reference recording clock signal according to a phase difference signal from the second LPF 29f, and a second frequency dividing circuit 29h for dividing a frequency of the second VFO 29g to a frequency corresponding to a wobble signal. The recording reference-clock generating portion and the reproduction reference-clock generating portion construct respective phase locked loops (PLL). A division ratio to be set by the first frequency dividing circuit 29d is given as a ratio of a frequency necessary for a recording reference-clock to a wobble signal frequency. A division ratio to be set by the second frequency dividing circuit 29h is given as a ratio of a frequency necessary for a reproduction reference-clock to a wobble signal frequency. In case when, for example, a wobble signal frequency at a first zone on an optical magnetic disk 1 at a constant rotation speed is 50 KHz, a recording-reference clock (usually a recordable-data channel-bit frequency multiplied by an integer) is 23.2 MHz and a reproduction reference frequency (usually a reproduced-data channel-bit frequency) is 11.6 MHz, the first frequency dividing circuit sets a division ratio at 1/464 and the second frequency dividing circuit sets a division ratio at 1/232. The clock generating circuit 29 generates a recording reference clock and a reproduction reference clock, which have always constant frequency ratios to a wobble signal frequency. Although the above-mentioned embodiment generates two different reference clocks for recording and reproducing operations, it may use a reference clock common for recording and reproducing operations. This variation may have a more compact circuitry by commonly using components of the phase lock loops (PLL).

On the other hand, the magneto-optical disk 1 has a form described in the embodiment 1 or 2. Accordingly, the recording and reproducing device of the above-described embodiment uses the magneto-optical disk at a constant rotation rate, which changes wobble signal frequency at respective zones thereon. The wobble signal frequency increases with changing a zone from inner one to an outer neighbor. The laser driving circuit 21 controls the power of laser beam according to the wobble frequency (i.e., the wobble signal frequency at a corresponding zone on the disk) and the clock generating circuit 29 generates a recording or reproducing reference-clock for the current zone according to the wobble frequency therefrom.

Figure 19:
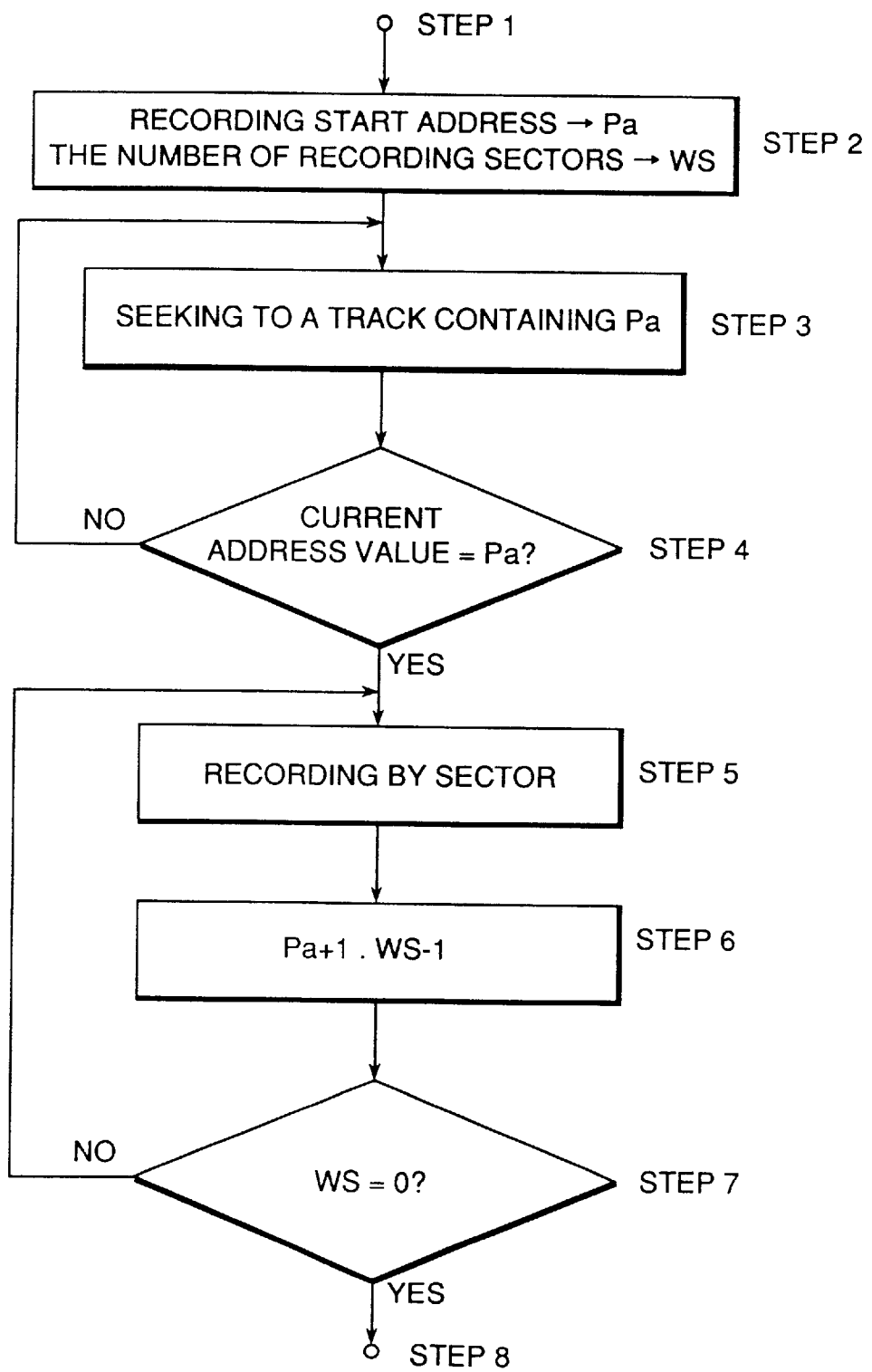
FIG. 19 is a flow chart describing a recording operation sequence of a disk recording and reproducing device according to embodiments 3 and 4 of the present invention.

The recording and reproducing operations of the disk recording and reproducing device is as follows:

FIG. 19 is a flow chart describing the recording operation sequence of the disk recording and reproducing device. When a recording instruction from a host processor is given through a terminal 33, the controller 35 recognizes the receipt of the instruction through the host interface 34 and begins the processing operation for recording data (Step 1). At Step 2, the controller 35 determines a physical address value Pa from a recording start sector address designated by the host processor and sets the number of designated recording sectors as a parameter WS.

At Step 3, the controller 35 performs accessing to a track containing the designated recordable sectors. In this case, the controller 35 recognizes current address values obtained from the address detection circuit 27 and controls, through the servo control circuit 24, a feed motor (not shown) and the optical head 22 to move and set a laser beam at a desired position on the disk. After positioning the laser beam at the desired position on the disk, the wobble detection circuit 25 extracts a wobble signal at a groove or a land being traced at present and the laser driving circuit 21 determines, a laser beam power necessary for recording or reproducing data at a radial position on the disk whereat the laser beam falls at present (i.e., a laser beam power corresponding to a linear velocity between the laser beam and the optical magnetic disk). More strictly speaking, a reproducing laser beam power is used for the period of searching an address before starting a recording operation and a recording laser beam power (to be described later) is applied when the recording operation starts. The clock generating circuit 29 generates a recording reference clock signal corresponding to a zone at current radial position on the disk.

At Step 4, a current address obtained by the address detection circuit 27 is checked for whether it matches with the preset value Pa. If so, the process advances to Step 5 for starting the recording of data on a sector. In this case, the recording data processing circuit 30 prepares recordable data (form (3c) in FIG. 9) from recordable data input received through the terminal 33 of the host interface 34 from the host processor, i.e., by dividing the input data into data of a specified sector size (e.g., 4096 bytes) and adding an error detection code to each unit. An array of the thus generated data for one sector is modulated and sent to the magnetic head driving circuit 31 according to the recording reference clock. The magnetic head 32 applies a modulation magnetic field corresponding to the sector data and the optical head 22 emits a light beam having the specified recording power selected according to the wobble frequency from the wobble detection circuit 25. The data is now recorded on the desired sector on the disk.

On completion of recording data on a sector (Step 5), the number of recordable sectors (WS) is updated (Step 6) and the number WS is checked for whether it is equal to zero (Step 7). The recording operation is judged to have been finished when the number WS is zero and the recording process ends (Step 8). If unfinished, the process returns to Step 5 and the operation is repeated until the number of sectors designated by the host becomes zero.

Figure 20:
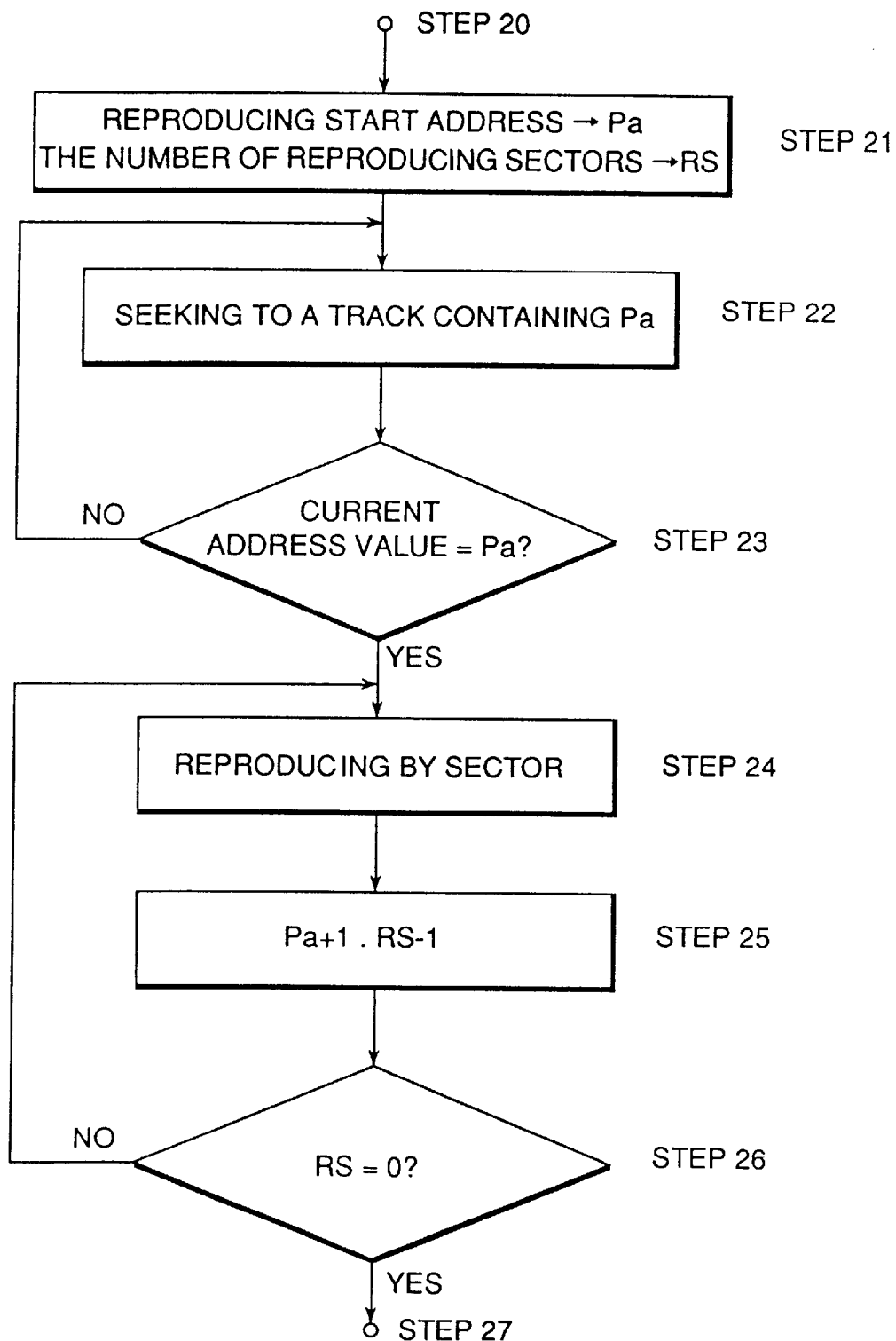
FIG. 20 is a flow chart describing a reproducing operation sequence of a disk recording and reproducing device according to embodiments 3 and 4 of the present invention.

Referring to FIG. 20, the reproducing operation of the device will be described.

FIG. 20 is a flow chart describing the reproducing operation sequence of the disk recording and reproducing device. When a reproducing instruction from a host processor is given through a terminal 33, the controller 35 recognizes the receipt of the reproducing instruction through the host interface 34 and begins the processing operation for reproducing data (Step 20).

At Step 21, the controller 35 determines a physical address value Pa from a reproduction starting sector address designated by the host processor and sets the number of designated reproduction sectors as a parameter RS.

At Step 22, the controller 35 performs accessing to a track containing the sectors designated to be reproduced. After positioning the laser beam at the desired position on the disk, the wobble detection circuit 25 extracts a wobble signal at a groove or a land being traced at present and the laser drive circuit 21 determines a laser beam power necessary for reproducing data at a radial position on the disk whereat the laser beam falls at present (i.e., a laser beam power corresponding to a linear velocity between the laser beam and the magneto-optical disk). The clock generating circuit 29 generates a reproduction reference clock signal corresponding to a zone at current radial position on the disk.

At Step 23, a current address obtained by the address detection circuit 27 is checked for whether it matches with the preset value Pa. If so, the process advances to Step 24 for starting the reproduction of data from a sector. In practice, the reproduction data processing circuit 28 conducts the decoding of data field with error correction on the basis of reproduction reference clock supplied from the clock generating circuit 29 and transmits the reproduced data to the host processor through the terminal 33 of the host interface 34.

On completion of reproducing data on a sector (Step 24), the reproduction address (Pa) and the number of reproduction sectors (RS) is updated (Step 25) and the number RS is checked for whether it is equal to zero (Step 26). The reproducing operation is judged to have been finished when the number RS is zero and the reproducing process ends (Step 27). If unfinished, the process returns to Step 24 and the operation is repeated until the number of sectors designated by the host becomes zero.

Thus, the disk recording and reproducing device converts logical addresses given by the host for reading or writing into physical addresses, rotates the disk at a constant rotation speed, performs recording/reproducing of data on the disk according to wobble signals of different frequencies extracted from respective zones thereof. Accordingly, the disk recording and reproducing device can realize, using a large storage capacity obtained by the ZCAV system, high-speed accessing to any desired position on the disk without changing the disk rotation speed. The device can also record or reproduce data on the disk in the manner suitable for the positioned zone according to wobble signals pre-recorded on the disk by the ZCAV method. In this embodiment, the wobble signals for respective zones are extracted with different zone frequencies at a constant rotation rate of the disk. This eliminates the need for providing separate reference-clock generating circuits for respective zones as are in the conventional devices. Namely, the generation of recording and reproducing reference clock signals can be realized by a simplified circuit system since the suitable zone wobble frequency can be obtained at a current position of a light beam on the disk. The recording or reproducing light-beam power can be controlled in accordance with its current radial position on the disk by means of the above-mentioned simple circuitry.

A disk recording and reproducing device which is another example of the embodiment 3 of the present invention will be described below, designating the same members by the same numerals.

Figure 21:
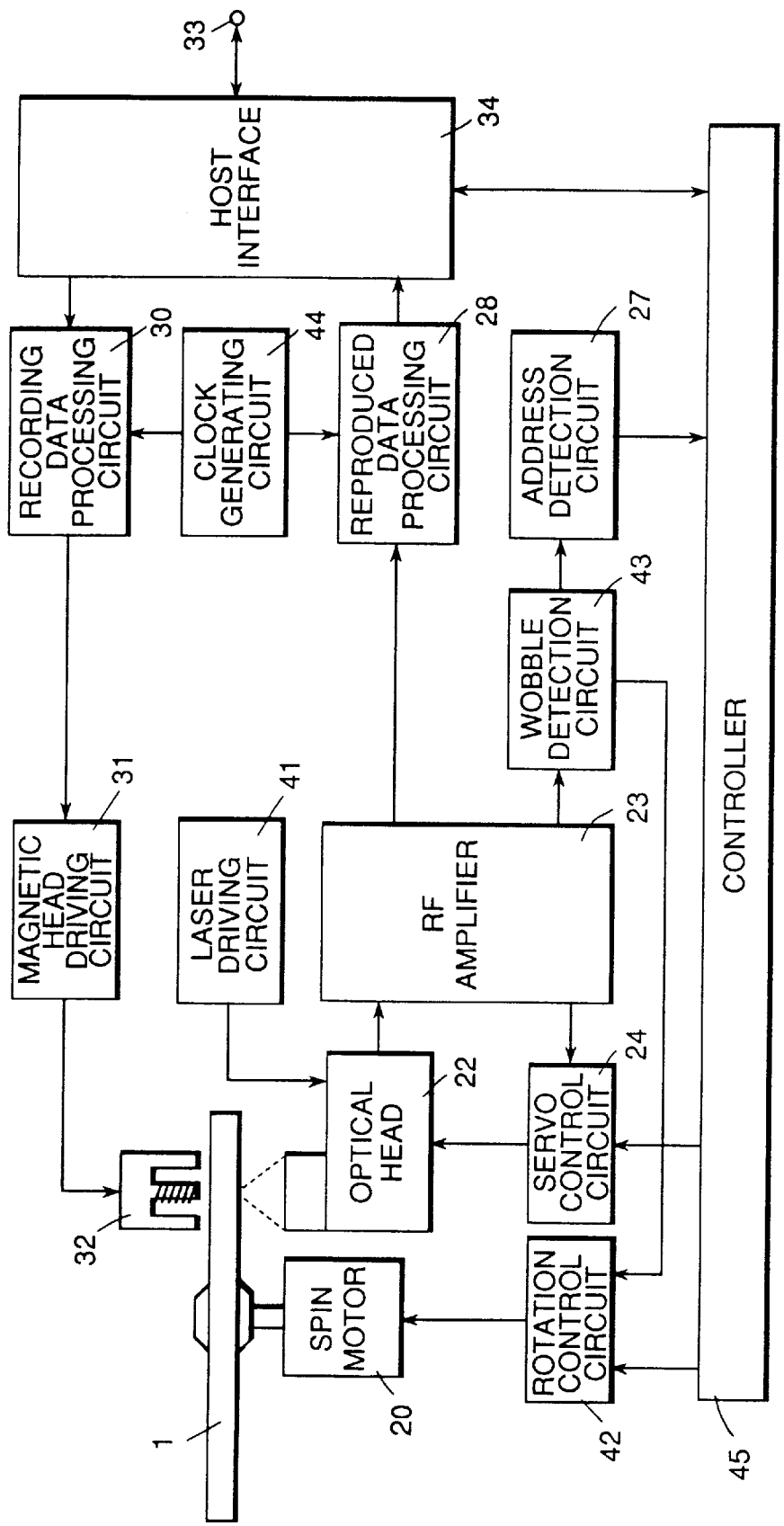
FIG. 21 is a construction view of another disk recording and reproducing device according to embodiment 3 of the present invention.

FIG. 21 is a construction view of a ZCLV-type disk recording and reproducing device for recording and reproducing data on a magneto-optical disk that is a disk type recording medium according to the embodiment 1 or 2 (without a header in recorded information) of the present invention. This device comprises a spin motor 20 for supporting and rotating a magneto-optical disk 1; an optical head 22 for generating a laser beam in response to a laser driving signal from a laser driving circuit 41, focusing the laser beam on a desired radial position on the rotating magneto-optical disk 1, detecting light reflected from the magneto-optical disk when reading data thereon or applying a laser beam having a higher strength to the magneto-optical disk when recording data thereon; a radio-frequency (RF) amplifier 23 for amplifying the detected signal from the optical head 22 to produce a reproduced data signal, a wobble signal, a servo tracking error signal or other specially designated signal; a magnetic head 32 for applying a magnetic field to the magneto-optical disk 1 when recording data thereon; a rotation control circuit 42 for controlling a constant rotation speed of the spin motor 20; a servo control circuit 24 for controlling the focusing and tracking operations of the optical head 22 and controlling a feed motor 11 (not shown) according to an servo tracking error signal from the RF amplifier 23 and an instruction signal from a controller 45; a wobble detection circuit 43 for detecting a wobble signal from the servo tracking error signal from the RF amplifier 23; an address detection circuit 27 for obtaining physical address information for locating the position of the laser beam on -he disk by demodulating and decoding the wobble signal from the wobble detection circuit 43; a host interface 34 for receiving a reproducing/recording instruction from a higher level and receiving/transmitting data from/to the host interface 34 through a terminal 33; recording data processing circuit 30 for generating necessary recordable data from the data received from the host interface 34 by adding error correction information thereto and modulating the prepared data into data adapted to be recorded according to a recording clock signal from the clock generating circuit 44; a magnetic head drive circuit 31 for driving the magnetic head 32 to produce a magnetic field suitable for the recorded data from the recording data processing circuit 30; a reproduced data processing circuit 28 for transmitting error-corrected reproduced data to the host interface 34; and a controller 45 for controlling the components of the disk recording and reproducing device. The above-mentioned components are interconnected as shown in FIG. 21.

The disk rotation control circuit 42 is designed to compare a wobble signal supplied by the wobble detection circuit 43 with a rotation reference clock held therein and control the spin motor 20 to rotate at the same frequency and the same phase.

As described above, the disk rotation control circuit 42 can obtain a substantially constant linear velocity of the disk. The frequency of the recording and reproducing information is constant independent of radial zones on the disk and an optical light power is also constant. Consequently, the clock generating circuit 44 may generate a predetermined recording and reproducing reference frequencies and the laser drive circuit 41 is given a constant optimal recording power and a constant optimal reproducing power at respective linear velocity of the disk independent of radial zones thereon.

The recording and reproducing operations of the disk recording and reproducing device are carried out in a procedure similar to that described for the first device of the embodiment 3. The procedure is, therefore, not described in detail but it differs from that of the first example by the fact that a linear velocity of a disk is substantially constant, i.e., a rotation rate of the disk (i.e., the spin motor) changes zone by zone (with a minimal change in the linear velocity) and recording and reproducing frequencies are also constant. Thus, the disk recording and reproducing device according to the present invention converts logical addresses given by the host for reading or writing into corresponding physical addresses on the disk and rotates the disk at a substantially constant linear velocity by controlling the spin motor to attain a specified value of the wobble signal. Therefore, the disk recording and reproducing device records or reproduces information on the disk at a constant frequency independent of radial zones. Accordingly, the disk recording and reproducing device can use a large storage capacity obtained by the ZCLV system and conduct recording or reproducing data on the disk at a high transfer rate independent of radial zones by rotating disk with a substantially constant linear velocity. In this embodiment, a constant wobble signal is prerecorded on each zone, which can be by changing the rotation speed of the disk zone by zone. This eliminates the need for providing a rotation sensor such as a rotary encoder employed in the conventional devices. Namely, the constant linear velocity control can be realized by the above-described simple circuitry using a wobble frequency corresponding to an area (zone) that a light beam is actually tracing at present.

(Embodiment 4)

A disk recording and reproducing device which is a fourth embodiment of the present invention will be described below in detail:

This embodiment has a first rotation control mode (ZCAV method) for driving an optical magnetic disk at a constant rotation frequency (speed) and a second rotation control mode (ZCLV method) for driving the optical magnetic disk at a constant linear velocity.

Figure 22:
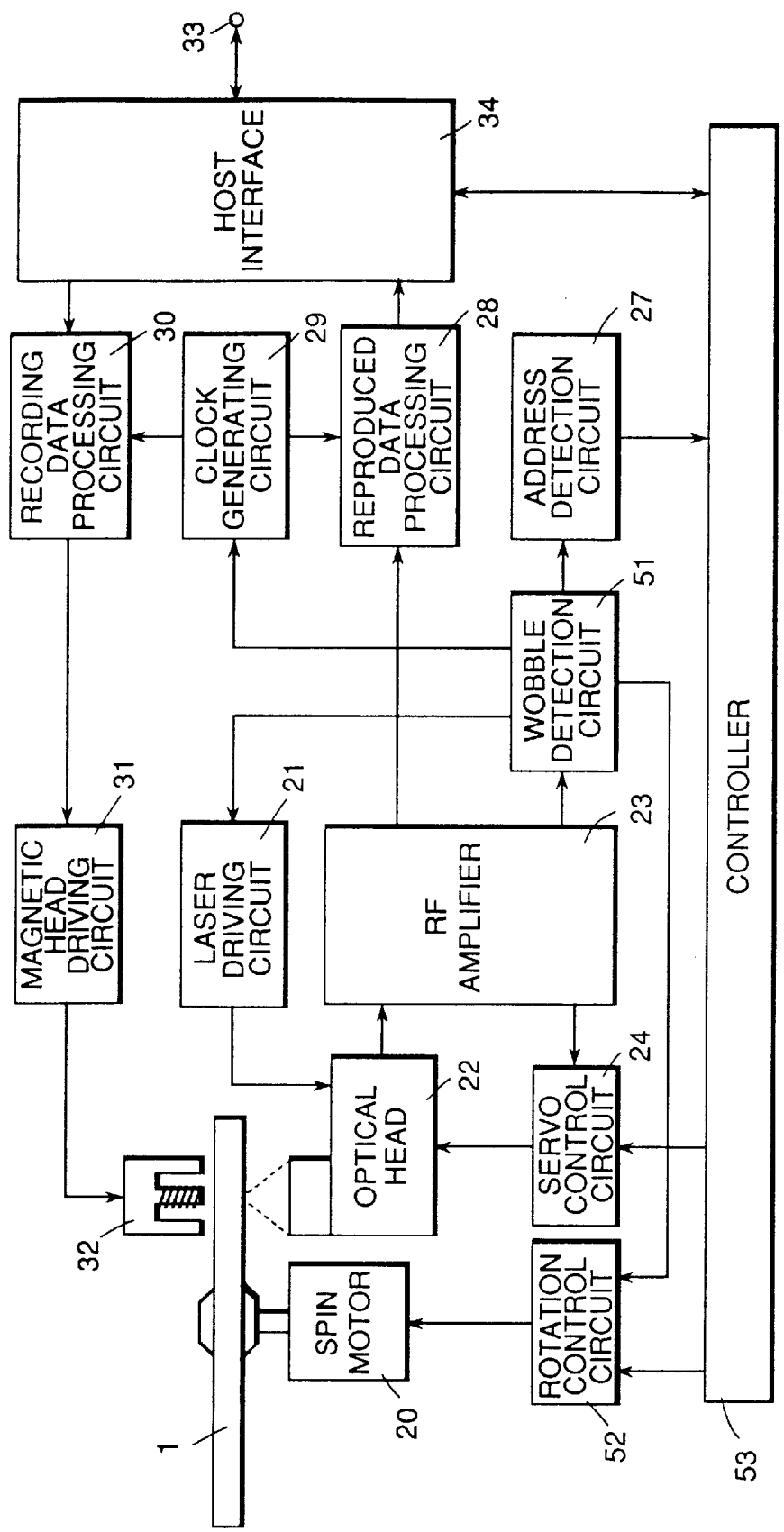
FIG. 22 is a construction view of a disk recording and reproducing device according to embodiment 4 of the present invention.

FIG. 22 is a construction view of a disk recording and reproducing device for recording and reproducing data on a magneto-optical disk that is a disk type recording medium according to the embodiment 1 or 2 (without using a header in recorded information) of the present invention. This device comprises a spin motor 20 for supporting and rotating a magneto-optical disk 1; an optical head 22 for generating a laser beam in response to a laser driving signal from a laser driving circuit 21, focusing the laser beam on a desired radial position on the rotating magneto-optical disk 1, detecting light reflected from the magneto-optical disk when reading data thereon or applying a laser beam having higher strength to the magneto-optical disk when recording data thereon; a radio-frequency (RF) amplifier 23 for amplifying the detected signal from the optical head 22 to produce a reproduced data signal, a wobble signal, a servo tracking error signal or other specially designated signal; a magnetic head 32 for applying a magnetic field to the magneto-optical disk 1 when recording data thereon; a rotation control circuit 52 for controlling a constant rotation speed (frequency) of the spin motor 20 to rotate at a desired rotation speed according to an instruction from a controller 53; a servo control circuit 24 for controlling the focusing and tracking operations of the optical head 22 and controlling a feed motor (not shown) according to an servo tracking error signal from the RF amplifier 23 and an instruction signal from a controller 53; a wobble detection circuit 51 for detecting a wobble signal from the servo tracking error signal from the RF amplifier 23; an address detection circuit 27 for detecting a physical address for locating the position of the laser beam on the disk by demodulating and decoding the wobble signal from the wobble detection circuit 51; a host interface 34 for receiving a reproducing/recording instruction and receiving/transmitting data from/to the host interface 34 through a terminal 33; recording data processing circuit 30 for generating necessary recording data from the data received from the host interface 34 by adding error correction information thereto and modulating the prepared data into data adapted to be recorded according to a recording clock signal from the clock generating circuit 29; a magnetic head drive circuit 31 for driving the magnetic head 32 to produce a magnetic field suitable for the recording data from the recording data processing circuit 30; a reproduced data processing circuit 28 for transmitting error-corrected reproduced data to the host interface 34; and a controller 53 for controlling the components of the disk recording and reproducing device. The above-mentioned components are interconnected as shown in FIG. 22.

Figure 23:
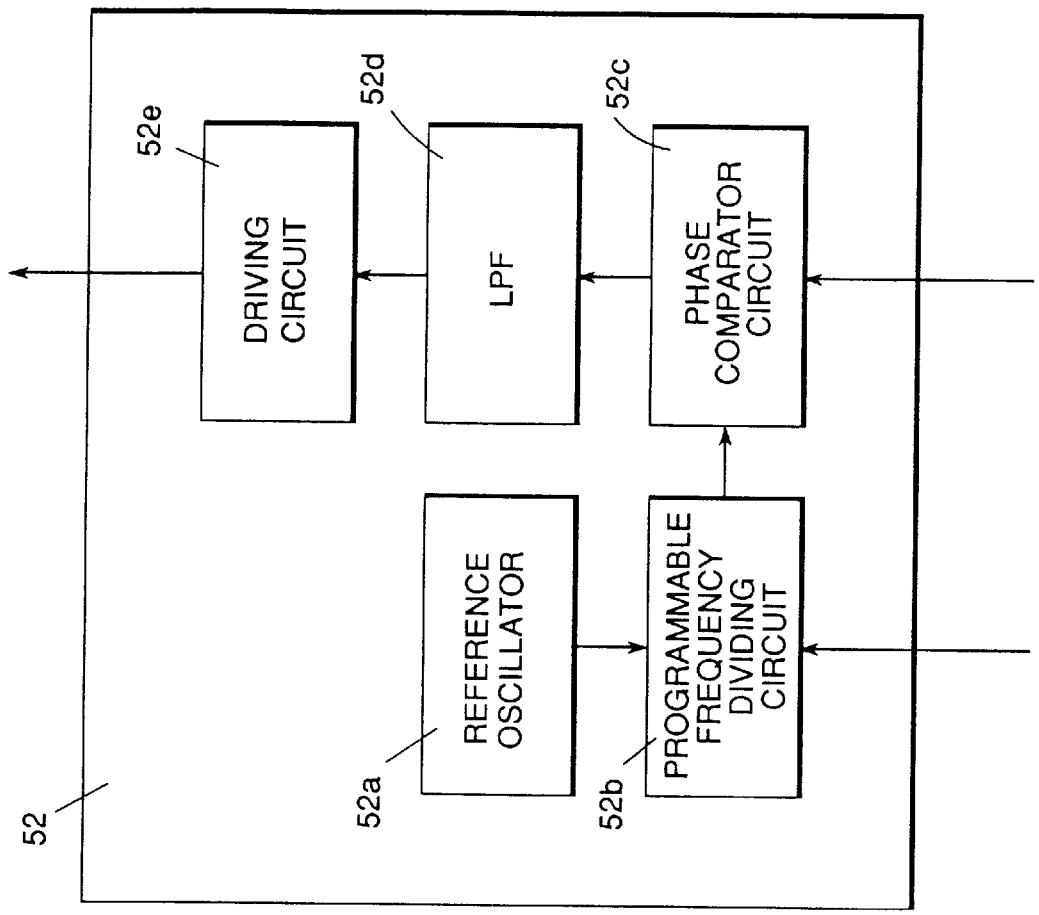
FIG. 23 is a construction view of a rotation control circuit of a disk recording and reproducing device according to embodiment 4 of the present invention.

FIG. 23 is a detailed construction view of the rotation control circuit 52. This rotation control circuit includes: a reference oscillator 52a for generating clock signals at a specified frequency; a programmable frequency dividing circuit 52b for dividing a clock signal from the reference oscillator 52a according to frequency dividing information given from the controller 53 and outputting a rotation reference clock signal corresponding to a wobble frequency at a desired disk rotation speed; a phase comparator circuit 52c for comparing a wobble signal extracted by the wobble detection circuit 51 with a rotation reference signal from a programmable frequency dividing circuit 52b and producing a rotation error signal; a low-pass filter (LPF) 52d for cutting off a high frequency component of a rotation error signal from the phase comparator 52c; and a driving circuit 52e for driving the spin motor 20 by using the rotation error signal from the LPF 52d.

The recording and reproducing operations of the disk recording and reproducing device are performed in a procedure similar to the procedure described for the embodiment 3, which is, therefore, omitted from the description but differs by the following points:

The disk recording and reproducing device has a plurality of disk rotation control modes, i.e., a first rotation control mode for rotating the disk at a constant rotation frequency (speed) and a second rotation control mode for rotating the disk at a substantially constant linear velocity, i.e., changing the rotation speed (speed) zone by zone. In FIG. 23, the rotation control circuit 52 changes over the first mode to the second mode and vice versa according to frequency dividing information given by the controller 53. In the first rotation control mode, the frequency dividing information given to the programmable frequency dividing circuit 52b is different depending on a radial zone of the disk: the further out radially the zone is, the smaller the given value is.

Consequently, the programmable frequency dividing circuit 52b has an output that is produced as a rotation reference clock whose frequency may increase with outer radial zones. The disk is driven in such a way so that the wobble frequency extracted from the wobble detection circuit 51 may be coincident with the rotation reference clock. Thus, the disk may rotate at a constant rotation frequency independent of radial zones thereof. In the second rotation control mode, the frequency dividing information given by the controller 53 is constant independent of radial zones on the disk. Namely, the disk is driven at a constant linear velocity by changing its rotation frequency zone by zone for recording or reproducing data thereon.

On the other hand, the laser drive circuit 21 and the clock generating circuit 29 of this embodiment may be the same in construction to those of the embodiment 3. Namely, the laser drive circuit 21 controls the laser light power according to a change in a wobble frequency. The laser drive circuit 21 controls the light power corresponding to each of radial zones (tracks) on the disk in the fist rotation control mode and emits a laser beam of a constant light power independent of the radial zones on the disk with a constant wobble frequency in the second rotation control mode. This circuit 21 can perform the above-mentioned operations in different modes in the same common circuit. The clock generating circuit 29 generates recording and reproducing reference frequencies according to a change in the wobble frequency. Namely, the clock generating circuit 29 generates recording and reproducing reference frequencies according to the radial zones on the disk in the first rotation control mode (in the same manner as described in the embodiment 3) and generates a constant recording or reproducing reference clock independent of the radial zones on the disk with a constant wobble frequency in the second rotation control mode. This clock generating circuit 29 can perform the above-mentioned operations in different modes in the same common circuit.

Thus, the disk recording and reproducing device converts logical addresses given by the host for reproducing or recording into physical addresses and performs recording/ reproducing of data on the disk according to wobble signals of different frequencies extracted from respective zones thereof by rotating the disk at a constant rotation frequency (speed) in the first rotation control mode or according to a wobble frequency extracted at a constant frequency by rotating the disk at a substantially constant linear velocity in the second rotation control mode. Accordingly, the device can use a large storage capacity obtained by the ZCAV system and perform high-speed accessing to any desired position on the disk without changing the disk rotation speed and recording/reproducing operations on the disk in the manner suitable to the positioned radial zone according to respective wobble signals pre-recorded thereon by the ZCAV method. In the first rotation control mode, the wobble signals for respective zones are extracted with different frequencies at a constant rotation rate of the disk. This eliminates the need for providing separate reference-clock generating circuits for respective zones as are in the conventional devices. Namely, the generation of recording and reproducing reference clock signals can be realized by a simplified circuit system since the suitable zone wobble frequency can be obtained at a current position of a light beam on the disk. The recording or reproducing light-beam power can be controlled in accordance with its current radial position on the disk by means of the above-mentioned simple circuitry. In the second rotation control mode, the device can use a large storage capacity obtained by the ZCLV system and conduct recording or reproducing data on the disk at a high transfer rate independent of radial zones by rotating disk with a substantially constant linear velocity. In this case, a constant wobble signal is pre-recorded on each zone, which can be obtained by changing the rotation speed of the disk zone by zone. This eliminates the need for providing a rotation sensor such as a rotary encoder employed in the conventional devices. Namely, the constant linear velocity control can be realized by the above-described simple circuitry using a wobble frequency corresponding to an area (zone) that a light beam is actually tracing at present.

(Embodiment 5)

A disk recording and reproducing device which is a fifth embodiment of the present invention will be described below in detail:

This embodiment uses a magneto-optical disk 1 of the type shown in FIG. 14 or 15, which is the embodiment 1 or 2 of the present invention, i.e., the magneto-optical disk having pre-recorded information formed on its lands and grooves by the ZCAV method. The following description relates to a disk recording and reproducing device corresponding to the embodiment 3 of FIG. 16 wherein a disk described with reference to FIG. 15 is used.

As shown in FIG. 6, a surface of a disk 1 is divided into 3 radial areas (zones) 1a, 1b and 1c numbered from the outer periphery of the disk. The area 1a further includes, as shown in FIG. 15, a plurality of grooves 13a and lands 13b (between grooves), each pair of a groove and a land has a physical address information. The area 1b consists of paired grooves 13c and lands 13d (not shown) and the area 1c consists paired groove 13e and lands; 13f (not shown). The physical address information has the same value for neighboring groove and land. The value of the physical address information successively increases in the direction from the outer periphery to the inner periphery.

On the other hand, logical addresses given from a host are converted by a controller 35 into corresponding physical addresses which are pre-recorded in the form of wobbles on respective groove-land pairs on the disk. These physical addresses are used for accessing, recording and reproducing data on the disk by the disk recording and reproducing device.

Figure 24:
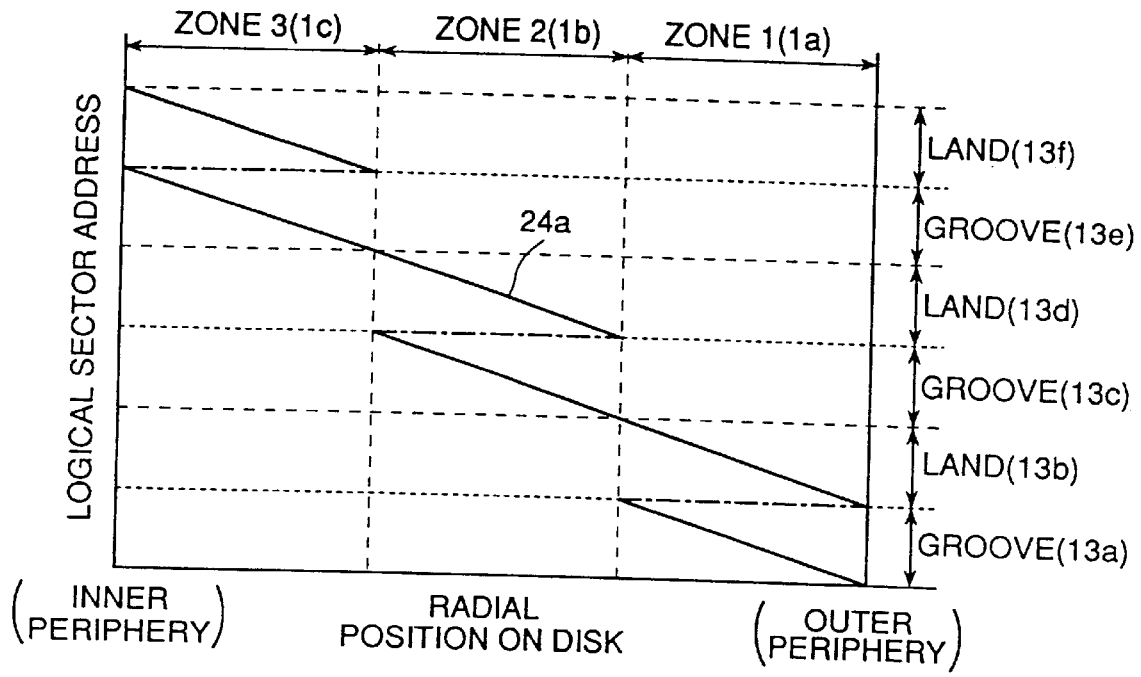
FIG. 24 is a view for explaining an allocating method of logical addressing relative to physical addressing by a disk recording and reproducing device according to embodiment 5 of the present invention.

FIG. 24 depicts the conversion of a logical address to a physical address by the controller in the disk recording and reproducing device according to the present embodiment. In the graph of FIG. 24, there is shown a logical address 24a given by the host, which corresponds to a radial position on the disk (physical addresses given to them in the ascending order from the outer radial position to the inner radial position on the disk). Namely, a groove 13a in an area 1a on the magneto-optical disk 1 is allocated to a smallest address group and a land 13b of the same radial zone is allocated to a successive logical address group. A groove 13c, land 13d, groove 13e and land 13f are allocated to further successive logical address groups respectively.

The above-mentioned logical address allocation can create a successive logical-address space which is formed by a groove and a land according to the ZCAV system and is assigned a zone having the same transfer rate. This realizes that a smaller logical-address area can have a higher transfer rate.

Usually, a user begins use of a new disk of this type from the smallest logical address side and rarely uses all tracks of the disk. Accordingly, the user may effectively utilize the disk at a higher transfer rate especially for the initial period of use. In the ZCLV system that requires changing the rotation speed of the disk zone by zone, the above-mentioned logical address allocation can effectively reduce accessing operations over zones accompanied by changing the rotation speed of the disk especially in recording or reproducing image information using a space of successive logical addresses. This can further improve an average transfer rate.

Figure 25:
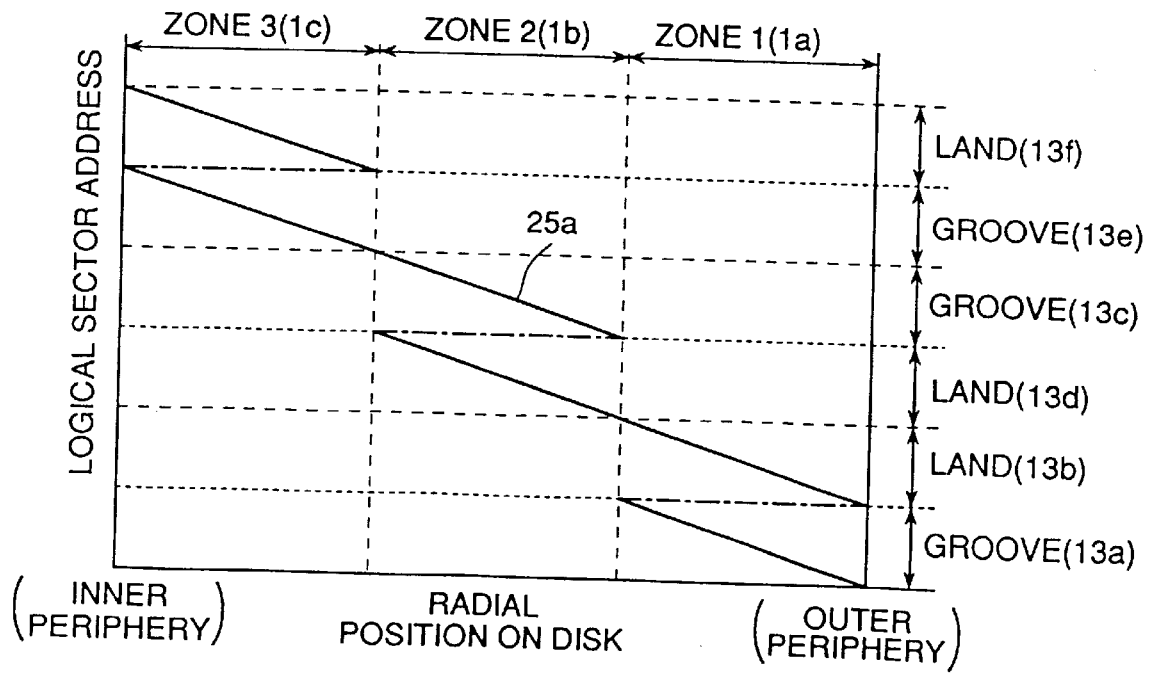
FIG. 25 is a view for explaining another allocating method of logical addressing relative to physical addressing by a disk recording and reproducing device according to embodiment 5 of the present invention.

FIG. 25 depicts the conversion of a logical address to a physical address by the controller in another variation of the embodiment of the present embodiment. In the graph of FIG. 25, there are shown logical addresses 25a given by the host corresponding to radial positions on the disk (physical addresses given to them in the ascending order from the outer radial position to the inner radial position on the disk).

Namely, a groove 13a in an area 1a on the magneto-optical disk 1 is allocated to a smallest address group and a land 13b of the same radial zone is allocated to a successive logical address group. A land 13d, groove 13c, groove 13e and land 13f are allocated to further successive logical address groups respectively.

Each radial zone on the disk has a logical-address space to which grooves and lands are allocated alternately in succession. This makes it possible to omit switching-over a groove to a land or a land to groove in continuous recording or reproducing of data over different zones, thus saving a time taken for changing-over operation.

(Embodiment 6)

A disk recording and reproducing device which is a sixth embodiment of the present invention will be described below in detail:

This embodiment uses a magneto-optical disk 1 of the type shown in FIG. 14 or 15, which is the embodiment 1 or 2 of the present invention, i.e., the magneto-optical disk having pre-recorded information formed on its lands and grooves by the ZCAV method. The following description relates to the case that a disk recording and reproducing device corresponding to the embodiment 3 of FIG. 21 operates with a disk described referring to FIG. 15.

As shown in FIG. 6, a surface of a magneto-optical disk 1 is divided into 3 radial areas (zones) 1a, 1b and 1c from the outer peripheral side. As shown in FIG. 15, the area 1a further includes pairs of groove 13a and land 13b, which have physical address information. The area 1b consists of pairs of groove 13c and land 13d (not shown) and the area 1c consists of pairs of groove 13e and land 13f (not shown). The physical address information indicates the same value for neighboring groove and land and indicates values successively ascending in the direction from the outer periphery to the inner periphery.

On the other hand, logical addresses given from a host are converted by a controller 45 into corresponding physical addresses which are pre-recorded in the form of wobbles on respective groove-land pairs on the disk. These physical addresses are used for accessing, recording and reproducing data on the disk by the disk recording and reproducing device.

Figure 26:
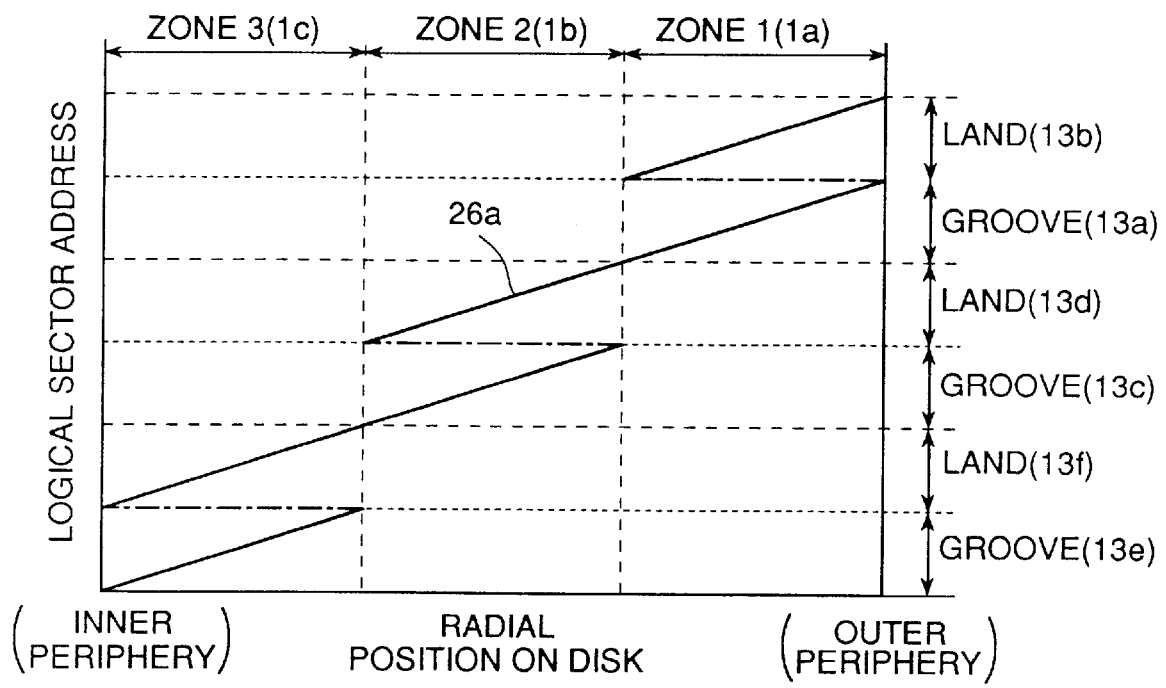
FIG. 26 is a view for explaining an allocating method of logical addressing relative to physical addressing by a disk recording and reproducing device according to embodiment 6 of the present invention.

FIG. 26 depicts the conversion of a logical address to a physical address by the controller 45 in the disk recording and reproducing device according to the present embodiment. In FIG. 26, there is shown a logical address 26a given by the host, which corresponds to a radial position on the disk (physical addresses given to them in the ascending order from the innermost zone to the outermost zone on the disk). Namely, a groove 13e in an area 1c on the magneto-optical disk 1 is allocated to a smallest address group and a land 13f of the same radial zone is allocated to a succeeding logical address group. A groove 13c, land 13d, groove 13a and land 13b are allocated to further succeeding logical address groups respectively.

The above-mentioned logical address allocation allows the ZCLV system to have a continuous logical-address space with no need for changing disk-rotation frequency. In other words, it enables the ZCLV system to enlarge an area allowing continuous recording without changing the disk rotation frequency as well as to obtain a shorter access time since an area of a smaller logical address value may have a higher disk rotation frequency (reducing a waiting time).

Usually, a user begins use of a new disk of this type from the smallest logical address side and rarely uses all tracks of the disk. Accordingly, the user may effectively utilize the disk at a shorter access time especially for the initial period of use.

(1) A disk-type recording medium according to the present invention can be used for recording and reproducing data thereon with a high data-transfer rate by the ZCLV method when being used for reproducing or recording a series of data (e.g., image data) as well as for recording and reproducing data thereon by high-speed accessing by the ZCAV method when being used in a computer. This disk can be commonly applied in both systems. This is convenient to users. This disk is versatile and therefore suitable for mass production at a reduced cost. Furthermore, this disk-type recording medium has no pit-type header and can easily shorten track pitches to increase its storage capacity.

(2) A disk-type recording medium according to the present invention has the item (1) above-described and can further allow a recording and reproducing device to record data thereon by using its maximum performance of linear recording density. The disk capacity can be thus increased.

(3) A disk-type recording medium according to the present invention can improve data utilization and increase its storage capacity.

(4) A disk recording and reproducing device according to the present invention is an inexpensive device which is capable of recording and reproducing data on a disk with high-speed accessing by the ZCAV method. The disk-type recording medium whereon data has been recorded by this device, can be used for recording and reproducing data in another device using the ZCLV method. The disk has a complete compatibility between devices adopting different rotation control methods.

In the device using the ZCAV method, reference clock signals for recording and reproducing are produced in accordance with wobble frequencies different for respective zones. This eliminates the need for providing separate reference-clock generating circuits one for each zone as are provided in the conventional devices. Namely, the generation of recording and reproducing reference clock signals can be realized by a simplified circuit system since the suitable zone wobble frequency is obtained at a current position of a light beam on the disk. The recording or reproducing light-beam power can also be controlled according to wobble frequencies by means of the above-mentioned simple circuitry.

(5) A disk recording and reproducing device according to the present invention is an inexpensive device which is capable of recording and reproducing successive data of, e.g., video image on a disk with high-speed accessing by the ZCLV method. The disk-type recording medium whereon data has been recorded by this device, can be used for recording and reproducing data in another device using the ZCAV method. The disk has a complete compatibility between devices adopting different rotation control methods.

In the device of the ZCLV system, the disk rotation is controlled so as to obtain a constant wobble signal for each zone. This eliminates the need for providing a rotation sensor such as a rotary encoder employed in the conventional devices. Namely, the constant linear velocity control can be realized by the above-described simple circuitry using a wobble frequency corresponding to an area that a light beam is actually tracing at present.

(6) A disk-type recording medium according to the present invention can be used for recording and reproducing data thereon with a high data-transfer rate by the ZCLV method when being used for reproducing or recording a series of data (e.g., image data) as well as for recording and reproducing data thereon by high-speed accessing by the ZCAV method when being used in a computer. It is convenient for one to select either one of two systems of the device according to the application purpose.

(7) A disk recording and reproducing device according to the present invention is capable of generating recording and reproducing reference clock signals from wobble signals extracted from a disk-type recording medium, thus realizing the common use of a reference clock generating circuit by the ZCAV system and the ZCLV system. This may reduce a manufacturing cost of the device.

(8) A disk recording and reproducing device according to the present invention is capable of obtaining rotation control information from the disk even in the ZCAV system. Accordingly, the rotation control can be easily conducted without using a special rotation-detector (e.g., rotary encoder). In the device that can selectively use either one of the ZCAV system and the ZCLV system, the rotation controller can be commonly used for two systems.

(9) A disk recording and reproducing device according to the present invention with use of a disk having a physical address information whose value ascending in the direction from the outside to the inside of the disk allows: the ZCAV system to allocate a continuous logical address space formed by pairs of groove and land to a zone having the same transfer rate to increase data-transfer rate with areas having smaller logical address value (i.e., a user can effectively use a disk at a higher data transfer rate for the initial period of using a new disk); and the ZCLV system to further improve an average transfer rate by effectively reducing accessing operations over zones accompanied by changing the rotation speed of the disk especially in recording or reproducing image information using a space of continuous logical addresses. With a disk having a physical address information whose value ascending in the direction from the inside to the outside of the disk, the disk recording and reproducing device allows user of the ZCAV system to start using the disk from the inner tracks with a shorter waiting (access) time.

(10) A disk recording and reproducing device according to the present invention is capable of omitting switching-over a groove to a land or a land to a groove in recording and reproducing data over zones.

I claim:

1. A disk recording and reproducing device for recording and reproducing data, comprising:

a disk type recording medium having spiral or concentric grooves being divided radially into a plurality of zones to be traced by a light beam, wherein physical address information and sector boundary information are previously recorded by groove wobbling according to a zone constant angular velocity system, said recording medium including wobbling frequencies of said physical address information which are obtainable at a constant angular velocity of disk rotation and which are constant in each zone, the respective wobbling frequencies of said zones increasing toward a disk periphery;

a rotation controller for rotating said disk type recording medium at a constant rotation frequency;

reference clock generating means for generating a reference clock corresponding to a wobbling frequency obtained from said physical address information;

a recording controller for recording data in at least one of a groove and a land portion or in at least one of a plurality of grooves or a plurality of land portions of said disk type recording medium on the basis of said reference clock; and a reproduction controller for reproducing data recorded in said at least one of a groove and a land portion or in said at least one of a plurality of grooves or a plurality of land portions of the disk type recording medium on the basis of said reference clock.

2. The disk recording and reproducing device as defined in claim 1, wherein said reference clock generating means is commonly used by said recording controller and said reproduction controller.

3. The disk recording and reproducing device as defined in claim 1, wherein said rotation controller includes programmable frequency dividing means for generating reference frequencies corresponding to rotation control information of different frequencies for respective zones of the disk type recording medium.

4. The disk recording and reproducing device as defined in claim 1, further comprising address converting means for converting given logical address information to physical address information for a groove and/or a land portion or the grooves and/or the land portions, said address converting means allocates physical address values to ascend in order of groove to land portion or land portion to groove for each zone according to continuously ascending values of logical addresses.

5. The disk recording and reproducing device as defined in claim 4, wherein said address converting means allocates address values in the groove to land portion order in a zone and in the land portion to groove order in a neighboring zone.

6. A disk recording and reproducing device for recording and reproducing data, comprising:

a disk type recording medium having spiral or concentric grooves being divided radially into a plurality of zones to be traced by a light beam, wherein physical address information and sector boundary information are previously recorded by groove wobbling according to a zone constant angular velocity system, said recording medium including wobbling frequencies of said physical address information which are obtainable at a constant angular velocity of disk rotation and which are constant in each zone, the respective wobbling frequencies of said zones increasing toward a disk periphery;

a first rotation controller for rotating said disk type recording medium at a specified constant rotation frequency;

a second rotation controller from rotating said disk type recording medium at a constant wobbling frequency in each zone according to said physical address information;

rotation control change-over means for switching-over said first rotation controller to said second rotation controller and vice versa;

reference clock generating means for generating a reference clock corresponding to a wobbling frequency from said physical address information;

a recording controller for recording data in at least one of a groove and a land portion or in at least one of a plurality of grooves or a plurality of land portions of said disk type recording medium on the basis of said reference clock when said first rotation controller is selected, and for recording data in at least one of a groove and a land portion or in at least one of a plurality of grooves or a plurality of land portions of said disk type recording medium on the basis of said reference clock when said second rotation controller is selected; and a reproduction controller for reproducing data recorded in at least one of a groove and a land portion or in at least one of a plurality of grooves or a plurality of land portions of said disk type recording medium on the basis of said reference clock when said first rotation controller is selected, and for reproducing data recorded in at least one of a groove and a land portion or in at least one of a plurality of grooves or a plurality of land portions of said disk type recording medium on the basis of said reference clock when said second rotation controller is selected.

7. A disk recording and reproducing device for recording and reproducing data, comprising:

a disk type recording medium having spiral or concentric grooves being divided radially into a plurality of zones to be traced by a light beam, wherein physical address information and sector boundary information are previously recorded by groove wobbling according to a zone constant angular velocity system, said recording medium including wobbling frequencies of said physical address information which are obtainable at a constant angular velocity of disk rotation and which are constant in each zone, the respective wobbling frequencies of said zones increasing toward a disk periphery;

a rotation controller for rotating the disk type recording medium at a constant wobbling frequency in each zone according to a physical address information;

a recording controller for recording data in at least one of a groove and a land portion or in at least one of a plurality of grooves and a plurality of land portions of the disk type recording medium on the basis of a specified reference clock; and a reproduction controller for reproducing data recorded in at least one of a groove and a land portion or in at least one of a plurality of grooves and a plurality of land portions on the basis of the reference clock.

* * * * *